United States Patent
Park et al.

(10) Patent No.: US 10,327,204 B2
(45) Date of Patent: Jun. 18, 2019

(54) METHOD AND APPARATUS FOR POWER SAVING MODE OPERATION IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 199 days.

(21) Appl. No.: 15/310,078

(22) PCT Filed: May 11, 2015

(86) PCT No.: PCT/KR2015/004686
§ 371 (c)(1),
(2) Date: Nov. 9, 2016

(87) PCT Pub. No.: WO2015/170942
PCT Pub. Date: Nov. 12, 2015

(65) Prior Publication Data
US 2017/0273019 A1    Sep. 21, 2017

Related U.S. Application Data

(60) Provisional application No. 61/990,723, filed on May 9, 2014, provisional application No. 61/994,998, filed
(Continued)

(51) Int. Cl.
*H04W 52/02* (2009.01)
*H04W 74/06* (2009.01)
*H04W 84/12* (2009.01)

(52) U.S. Cl.
CPC ... *H04W 52/0209* (2013.01); *H04W 52/0216* (2013.01); *H04W 74/06* (2013.01);
(Continued)

(58) Field of Classification Search
CPC . H04L 5/00; H04L 12/18; H04Q 7/00; H04W 4/06; H04W 48/16; H04W 52/02;
(Continued)

(56) References Cited

U.S. PATENT DOCUMENTS 8,094,597 B1    1/2012  Chhabra et al.
2009/0003274 A1*  1/2009  Kwak ................ H04W 72/042
                                                      370/329
(Continued)

FOREIGN PATENT DOCUMENTS

CN    102369776    3/2012
CN    103348742    10/2013
(Continued)

OTHER PUBLICATIONS

Japan Patent Office Application No. 2017-511132, Office Action dated Jan. 9, 2018, 2 pages.
(Continued)

*Primary Examiner* — George C Atkins
(74) *Attorney, Agent, or Firm* — Lee Hong Degerman Kang Waimey

(57) ABSTRACT

A method and a corresponding apparatus, for a power saving mode operation in a wireless LAN, the method including: an AP transmitting, on the basis of a virtual bitmap of a TIM element comprised in a beacon frame, a PS-poll request frame to a plurality of target STAs that have received the indication of the existence of pended downlink data; the AP receiving, on overlapped time resources, each of a plurality of PS-poll frames from each of a plurality of PS-poll transmission STAs that are indicated on the basis of the
(Continued)

PS-poll request frame among the plurality of target STAs; and the AP, on the overlapped time resources, transmitting each of a plurality of downlink frames to each of the plurality of PS-poll transmission STAs as a response to each of the plurality of PS-poll frames.

10 Claims, 20 Drawing Sheets

Related U.S. Application Data on May 19, 2014, provisional application No. 62/014,691, filed on Jun. 20, 2014, provisional application No. 62/029,551, filed on Jul. 27, 2014.

(52) U.S. Cl.
CPC ............. *H04W 84/12* (2013.01); *Y02D 70/00* (2018.01); *Y02D 70/142* (2018.01); *Y02D 70/22* (2018.01)

(58) Field of Classification Search
CPC . H04W 52/0216; H04W 72/00; H04W 72/04; H04W 72/042; H04W 84/12
See application file for complete search history.

(56) References Cited

U.S. PATENT DOCUMENTS

| | | | |
|---|---|---|---|
| 2010/0067423 A1 | 3/2010 | Sun et al. | |
| 2013/0208637 A1* | 8/2013 | Abraham | H04W 52/02 370/311 |
| 2014/0086131 A1 | 3/2014 | Seok | |
| 2015/0173015 A1* | 6/2015 | Lee | H04W 52/0216 370/311 |
| 2015/0365885 A1* | 12/2015 | Yang | H04W 4/06 370/312 |

FOREIGN PATENT DOCUMENTS

| | | |
|---|---|---|
| CN | 103516461 | 1/2014 |
| JP | 2016530837 | 9/2016 |
| JP | 2016540426 | 12/2016 |
| KR | 1020130139761 A | 12/2013 |
| KR | 1020130139797 A | 12/2013 |
| KR | 1020140008261 A | 1/2014 |
| KR | 1020140037892 A | 3/2014 |
| WO | 2013187653 A1 | 12/2013 |
| WO | 2013187706 A1 | 12/2013 |
| WO | 2015070149 | 5/2015 |

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.9., pp. 473-474 (3 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.10., pp. 474-477(5 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.11., pp. 478-479 (3 pages provided).
"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.5.-8.3.3.6., pp. 467-468 (3 pages provided).
PCT International Application No. PCT/KR2015/004686, International Search Report dated Aug. 13, 2015, 2 pages.
State Intellectual Property Office of the People's Republic of China Application Serial No. 201580028777.1, Office Action dated Jan. 21, 2019, 6 pages.

* cited by examiner

FIG. 1
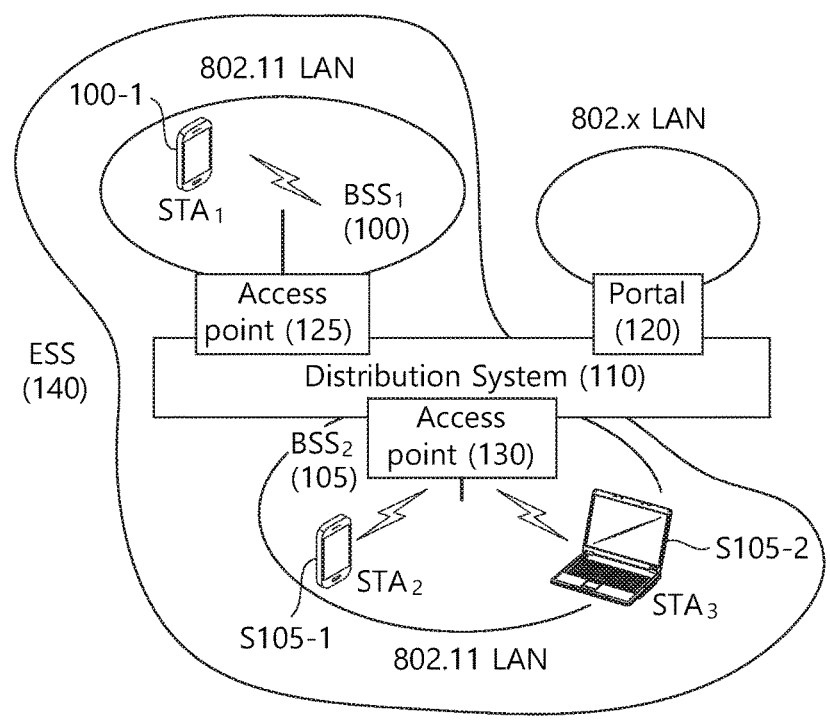
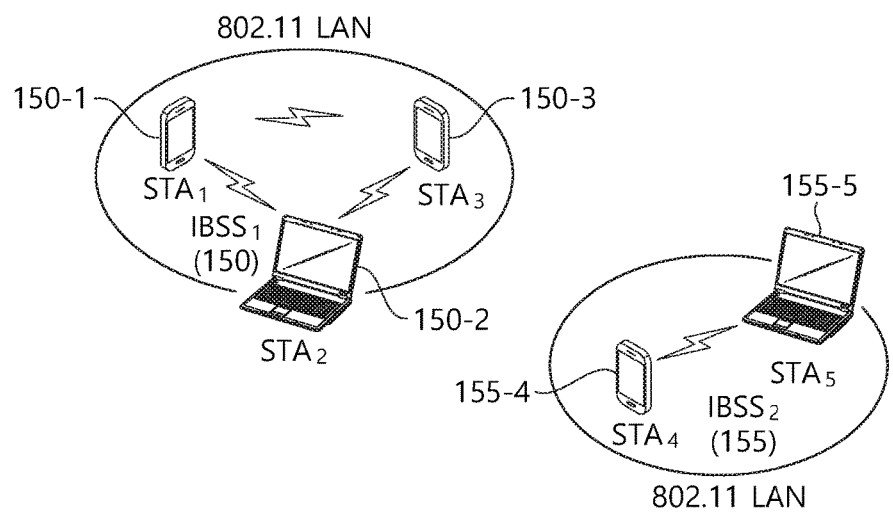

METHOD AND APPARATUS FOR POWER SAVING MODE OPERATION IN WIRELESS LAN

CROSS-REFERENCE TO RELATED APPLICATIONS

This application is the National Stage filing under 35 U.S.C. 371 of International Application No. PCT/KR2015/004686, filed on May 11, 2015, which claims the benefit of U.S. Provisional Application No. 61/990,723, filed on May 9, 2014, 61/994,998, filed on May 19, 2014, 62/014,691 filed on Jun. 20, 2014, and 62/029,551 filed on Jul. 27, 2014, the contents of which are all hereby incorporated by reference herein in their entirety.

BACKGROUND OF THE INVENTION

Field of the Invention

The present invention relates to wireless communication and, more particularly, to a method and apparatus for a power saving mode in a wireless local area network (WLAN).

Related Art

An IEEE 802.11 standard provides a power save mechanism (or power save mode) to increase the lifespan of a wireless local area network (WLAN) station (STA). The STA operating based on the power save mode may operate in an awake state or a doze state for power saving. The awake state is a state which enables a normal operation of the STA such as frame transmission or reception, channel scanning, etc. On the other hand, the doze state is a state in which power consumption is extremely reduced and thus frame transmission or reception and channel scanning are impossible. In a case where the STA usually operates in the power save mode, the STA is in the doze state and, when necessary, transitions to the awake state, thereby reducing power consumption.

If the STA operates for a long time in the doze state, power consumption of the STA is reduced. Therefore, the lifespan of the STA may be increased. However, frame transmission or reception is impossible in the doze state. Therefore, the STA cannot stay for a long time in the doze state. If a pending frame is generated in the doze state, the STA may transition to the awake state to transmit the frame to an access point (AP). However, if the STA is in the doze state and a pending frame to be transmitted to the STA exists in the AP, the STA cannot receive the pending frame from the AP, and cannot know that the pending frame exists in the AP. Therefore, the STA may acquire information regarding the presence/absence of the pending frame in the AP, and may operate by periodically transitioning to the awake mode in order to receive the pending frame in the AP.

The AP may acquire information regarding awake mode operating timing of the STA, and may transmit the information regarding the presence of the pending frame in the AP according to the awake mode operating timing of the STA.

More specifically, in order to receive information regarding the presence/absence of a frame to be received from the AP, the STA may periodically transition from the doze state to the awake state to receive a beacon frame. The AP may report the presence/absence of a frame to be transmitted to each STA on the basis of a traffic indication map (TIM) included in the beacon frame. The TIM is used to report the presence of a unicast frame to be transmitted to the STA, and a delivery traffic indication map (DTIM) may be used to report the presence of a multicast frame/broadcast frame to be transmitted to the STA.

SUMMARY OF THE INVENTION

An object of the present invention is to provide a method operating based on a power save mode in a wireless local area network (WLAN).

Another object of the present invention is to provide an apparatus operating based on a power save mode in a WLAN.

An operation method in a power saving mode in a WLAN according to an aspect for achieving an object of the present invention includes the steps of transmitting, by an access point (AP), a beacon frame, transmitting, by the AP, a power saving (PS)-poll request frame to a plurality of target stations (STA), receiving, by the AP, a plurality of PS-poll frames on overlapped time resources from a plurality of PS-poll transmission STAs which belongs to the plurality of target STAs and which are determined based on the PS-poll request frame, respectively, and transmitting, by the AP, a plurality of downlink frames to the plurality of PS-poll transmission STAs, respectively, in response to the plurality of PS-poll frames. The plurality of target STAs may include a plurality of STAs which belongs to a plurality of STAs associated with the AP and which have been notified of the presence of buffered traffic based on the virtual bitmap of a traffic indication map (TIM) element included in a beacon frame.

An access point (AP) for a power saving mode operation in a WLAN according to an aspect for achieving another object of the present invention includes a radio frequency (RF) unit transmitting or receiving a radio signal and a processor operatively connected to the RF unit. The processor may be implemented to transmit a beacon frame, transmit a power saving (PS)-poll request frame to a plurality of target stations (STA), receive a plurality of PS-poll frames on overlapped time resources from a plurality of PS-poll transmission STAs which belongs to the plurality of target STAs and which are determined based on the PS-poll request frame, respectively, and transmit a plurality of downlink frames to the plurality of PS-poll transmission STAs, respectively, in response to the plurality of PS-poll frames on overlapped time resources. The plurality of target STAs may include a plurality of STAs which belongs to a plurality of STAs associated with the AP and which have been notified of the presence of buffered traffic based on the virtual bitmap of a traffic indication map (TIM) element included in a beacon frame.

A plurality of STAs can reduce data pending in an AP while reducing unnecessary power consumption based on a power saving mode for uplink multi-user (UL MU) transmission.

BRIEF DESCRIPTION OF THE DRAWINGS

FIG. 1 is a conceptual diagram showing the configuration of a wireless local area network (WLAN).

DESCRIPTION OF EXEMPLARY EMBODIMENTS

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
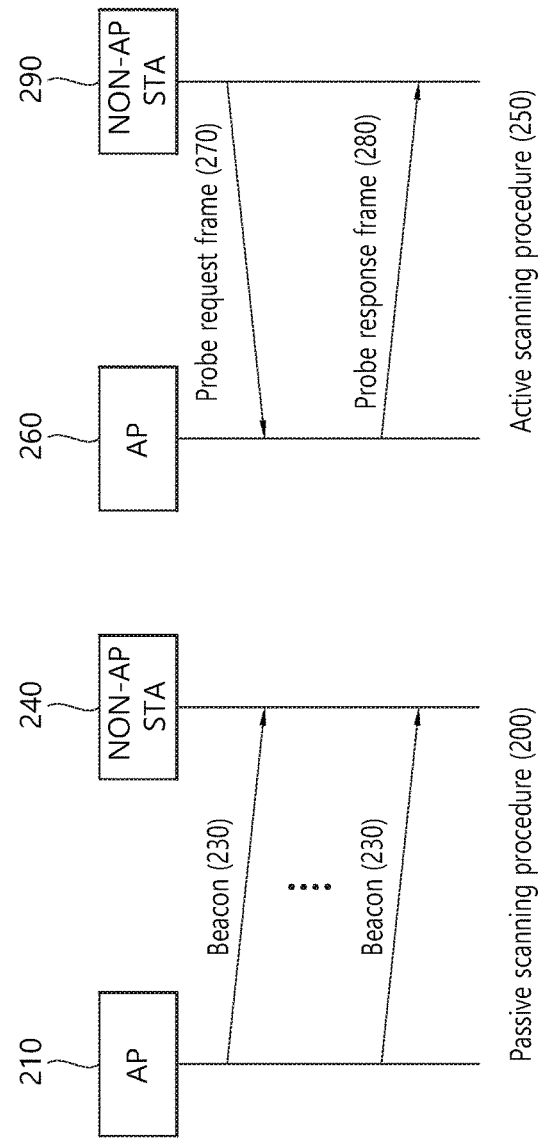
FIG. 2 is a conceptual diagram showing a scanning method in a WLAN.

FIG. 2 is a conceptual diagram showing a scanning method in a WLAN.

Referring to FIG. 2, the scanning method may be divided into passive scanning 200 and active scanning 250.

Referring to the left side of FIG. 2, passive scanning 200 may be performed by a beacon frame 230, which is periodically broadcasted by an AP 210. The AP 210 of the wireless LAN broadcasts a beacon frame 230 to a non-AP STA 240 at each specific interval (e.g., 100 msec). Information on the current network may be included in the beacon frame 230. By receiving the beacon frame 230 that is periodically broadcasted, the non-AP STA 240 receives the network information and may perform scanning on the AP 240, which will be performing the authentication/association procedure, and the channel.

The passive scanning method 200 may be performed by simply receiving the beacon frame 230 that is being transmitted from the AP 210 without requiring the non-AP STA 240 to transmit any frames.

Additionally, a FILS discovery frame may also be defined. As a frame being transmitted from each AP in-between the transmission cycle periods of the beacon frame, the FILS discovery frame may correspond to a frame that is transmitted while having a cycle period that is shorter than the beacon frame. More specifically, the FILS discovery frame corresponds to a frame that is being transmitted while having a transmission cycle period that is shorter than the beacon frame. The FILS discovery frame may include identifier information (SSID, BSSID) of the AP transmitting the discovery frame. The FILS discovery frame may be transmitted before the beacon frame is transmitted to the STA, so as to allow the STA to discover in advance that an AP exists within the corresponding channel. An interval at which the FILS discovery frame is transmitted is referred to as a FILS discovery frame transmission interval. The FILS discovery frame may be transmitted while including a portion of the information included in the beacon frame.

Referring to the right side of FIG. 2, in active scanning 250, a non-AP STA 290 may transmit a probe request frame 270 to an AP 260, thereby being capable of actively performing a scanning procedure.

After receiving the probe request frame 270 from the non-AP STA 290, the AP 260 waits for a random period of time in order to prevent frame collision. And, then, the AP 260 may include network information to a probe response frame 280 and may transmit the probe response frame 280 to the non-AP STA 290. The non-AP STA 290 may obtain the network information based on the received probe response frame 280 and may then stop the scanning procedure.

In case of active scanning 250, since the non-AP STA 290 actively performs scanning, it is advantageous in that the time consumed for performing the scanning procedure is short. However, since the non-AP STA 290 is required to transmit the probe request frame 270, it is disadvantageous in that the network overhead increases for the transmission and reception of the frames. The probe request frame 270 is disclosed in IEEE 802.11 8.3.3.9, and the probe response frame 280 is disclosed in IEEE 802.11 8.3.3.10.

Once the scanning is completed, the AP and the non-AP STA may perform the authentication and association procedures.

Figure 3:
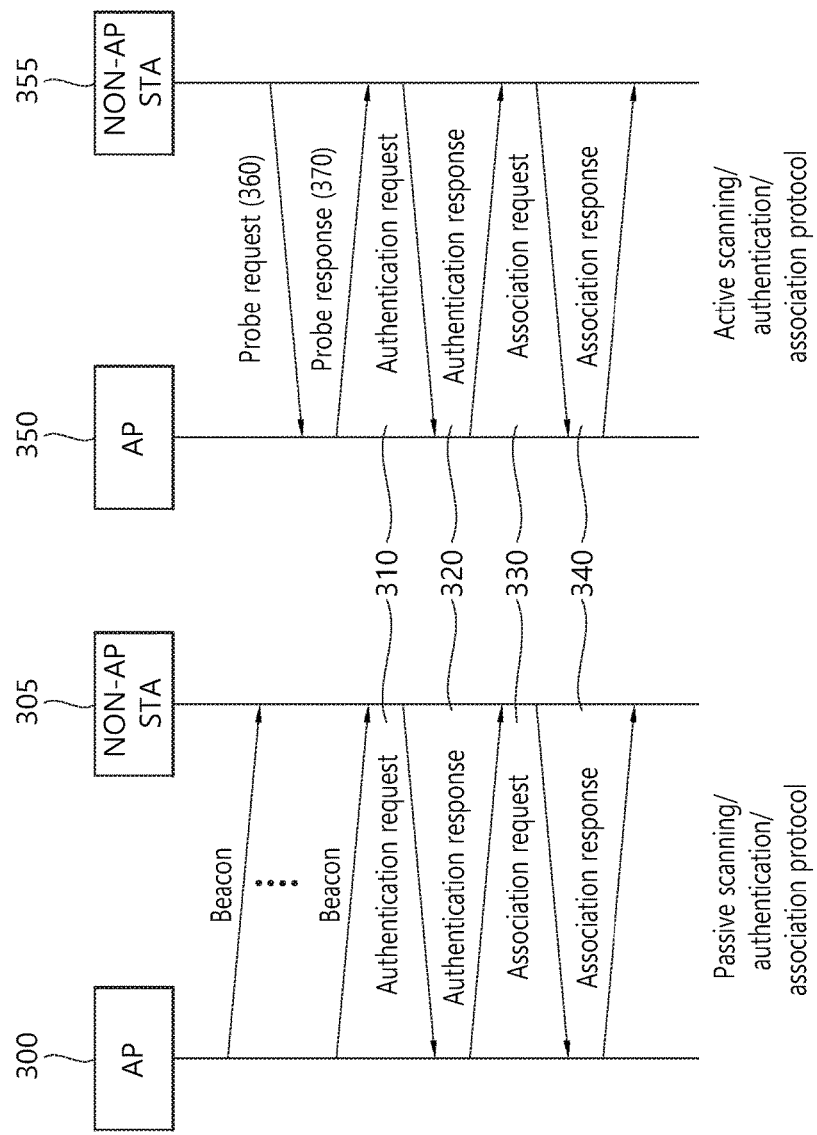
FIG. 3 is a conceptual diagram showing an authentication procedure and association procedure performed after the scanning procedure of an AP and an STA.

FIG. 3 is a conceptual view showing an authentication Procedure and an authentication procedure that are performed after a scanning procedure of an AP and a STA.

Referring to FIG. 3, after performing the passive/active scanning procedure, the authentication procedure and the association procedure may be performed with one of the scanned APs.

The authentication and association procedures may be performed, for example, through 2-way handshaking. The left side of FIG. 3 is a conceptual view showing the authentication and association procedures after performing passive scanning, and the right side of FIG. 3 is a conceptual view showing the authentication and association procedures after performing scanning.

Regardless of whether the active scanning method or the passive scanning method has been used, the authentication procedure and the association procedure may be equally performed by exchanging an authentication request frame 310/authentication response frame 320 and an association request frame 330/association response frame 340 between the AP 300 and 350 and the non-AP STA 305 and 355.

During the authentication procedure, the non-AP STA 305 and 355 may transmit an authentication request frame 310 to the AP 300 and 350. As a response to the authentication request frame 310, the AP 300 and 350 may transmit an authentication response frame 320 to the non-AP STA 305 and 355. Detailed description on the authentication frame format is disclosed in IEEE 802.11 8.3.3.11.

During the association procedure, the non-AP STA 305 and 355 may transmit an association request frame 330 to the AP 300 and 350. And, as a response to the association request frame 330, the AP 300 and 350 may transmit an association response frame 340 to the non-AP STA 305 and 355. Information related to the ability of the non-AP STA 305 and 355 is included in the association request frame 330, which is transmitted to the AP. Based on the capability information of the non-AP STA 305 and 355, the AP 300 and 350 may determine whether or not the non-AP STA 305 and 355 can be supported. In case the non-AP STA 305 and 355 can be supported, the AP 300 and 350 may transmit the association response frame 340 to the non-AP STA 305 and 355. The association response frame 340 may include information on whether or not the association request frame 330 is accepted and the corresponding reason and capability information of the non-AP STA that can be supported by the corresponding AP. Detailed description on the association frame format is disclosed in IEEE 802.11 8.3.3.5/8.3.3.6.

After the association procedure is carried out between the AP and the non-AP STA, normal transmission and reception of data may be performed between the AP and the non-AP STA. In case the association procedure between the AP and the non-AP STA has failed, based on the reason why the association procedure has failed, the association procedure may be performed once again with the same AP, or a new association procedure may be performed with another AP.

In case the STA is associated with the AP, the STA may be allocated with an association ID (association identifier, AID) from the AP. The AID that is allocated to the STA may correspond to a unique value within one BSS, and the current AID value may correspond to any one of the values within the range of 1~2007. Since 14 bits are allocated for the AID, although a maximum of 16383 bits may be used for the AID value, values within the range of 2008~16383 are reserved.

In the IEEE 802.11 standard, in order to extend the life span of STAs of a wireless LAN, a power save mechanism (Power save Mode) is provided.

An STA, which operates based on the Power Save mode, may reduce its power consumption by operating while shifting to and from an awake state and a doze state, thereby extending the operation life span of the STA.

An STA being in the awake state may perform normal operations, such as transmission or reception of frames, channel scanning, and so on. Conversely, an STA being in the doze state does not perform any transmission or reception of frames and does not perform any channel scanning in order to reduce power consumption. An STA operating in the Power Save mode maintains the doze state in order to reduce power consumption, and, then, when required, the corresponding STA may perform a shift (or transition) to the awake modes so as to carry out communication with the AP.

As the duration time for maintaining the doze state of the STA becomes more extended, the power consumption of the STA may be required, and the life span of the STA may be extended. However, in the doze state, it is impossible for the STA to perform the transmission or reception of frames. If a pending uplink frame exists in the STA, the STA, which was operating in the Power Save mode, may shift from a doze state to an active state, or, if a pending uplink frame exists in the STA, the STA, which was operating in the Power Save mode, may shift from a Power Save mode to an Active mode, thereby being capable of transmitting an uplink frame to the AP. Conversely, in case a pending frame that is to be transmitted to the STA, which is being operated in the doze state, exists in the AP, the AP cannot transmit the pending frame to the STA before the shift of the STA to the Awake mode.

Therefore, the STA operating in the Power Save mode may occasionally shift from the doze state to the awake state and may receive information on whether or not any pending frame for the STA exists from the AP. Considering a shifting time of the STA operating in the Power Save mode to the awake state, the AP may transmit information on the presence of pending downlink data for the STA to the STA.

More specifically, in order to receive information on the presence or absence of a pending frame for the STA, the STA operating in the Power Save mode periodically shifts from the doze state to the awake state, thereby being capable of receiving the beacon frame. As a frame being used for the passive scanning of the STA, the beacon frame may include information on the capability of the AP. The AP may periodically (e.g., 100 msec) transmit a beacon frame to the STA.

Figure 4:
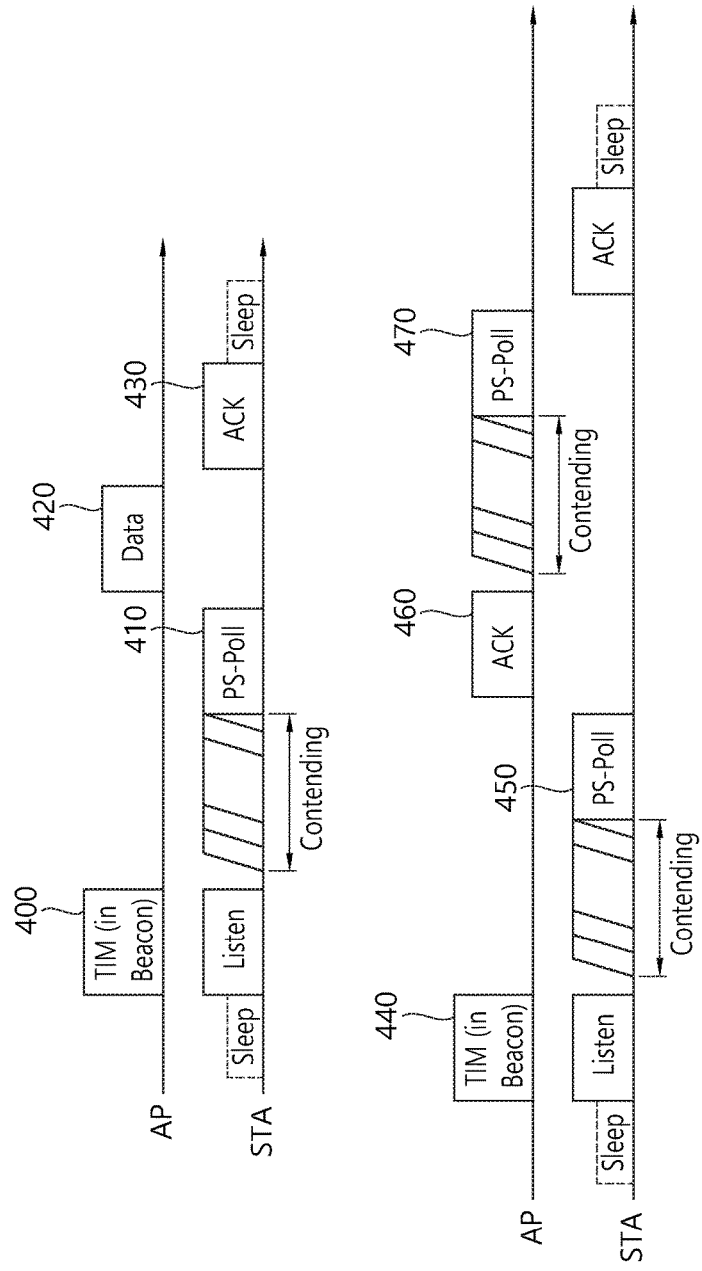
FIG. 4 is a conceptual diagram showing a power saving method based on a beacon frame.

FIG. 4 is a conceptual view showing a beacon frame based power saving method.

Referring to FIG. 4, the AP may periodically transmit a beacon frame, and, while considering the transmission timing of the beacon frame, the STA operating in the Power Save mode may periodically shift from the doze state to the awake state, thereby being capable of receiving the beacon frame The beacon frame may include a traffic indication map (TIM) element. The TIM element may be used for transmitting the information on the pending downlink data for the STA to the AP. For example, the TIM element may include information on the pending downlink data for the STA based on a bitmap.

The TIM element may be identified as a TIM or DTIM (delivery TIM). The TIM may indicate the presence of pending downlink data that are to be transmitted to the STA based on unicast. The DTIM may indicate the presence of pending downlink data that are to be transmitted based on broadcast/multicast.

The upper portion of FIG. 4 discloses a method of an AP for transmitting a downlink frame based on an immediate response to a power save (PS)-poll frame.

Referring to the upper portion of the FIG. 4, the STA may receive information on the presence of pending downlink data for the STA from the AP based on the TIM of the beacon frame 400. The STA may transmit a PS-poll frame 410 to the AP. The AP may receive the PS-poll frame 410 from the STA and may then transmit a downlink frame 420 to the STA as an immediate response to the received PS-poll frame 410. The immediate response to the PS-poll frame of the AP may be performed after a short interframe space (SIFS) after receiving the PS-poll frame.

The STA may transmit an ACK frame 430 as a response to the downlink frame. In case the transmission of the pending downlink data for the STA is ended, the STA operating in the Power Save mode may perform shifting (or transition) back to the doze state.

The lower portion of FIG. 4 discloses a method of an AP for transmitting a downlink frame based on a deferred response to a PS-poll frame.

Referring to the lower portion of the FIG. 4, the STA may receive information on the presence of pending downlink data for the STA from the AP based on the TIM of the beacon frame 440. The STA may transmit a PS-poll frame 450 to the AP. The AP may receive the PS-poll frame 450 from the STA and may then transmit an ACK frame 460 to the STA as a response to the received PS-poll frame 450. After the transmission of the ACK frame 460, the AP may transmit a downlink frame 470 including the pending downlink data to the STA. After receiving the ACK frame 460, the STA may monitor the downlink frame 470 being transmitted by the AP to the STA.

Similarly, in case the transmission of the pending downlink data for the STA is ended, the STA operating in the Power Save mode may perform shifting (or transition) from the awake state back to the doze state.

Figure 5:
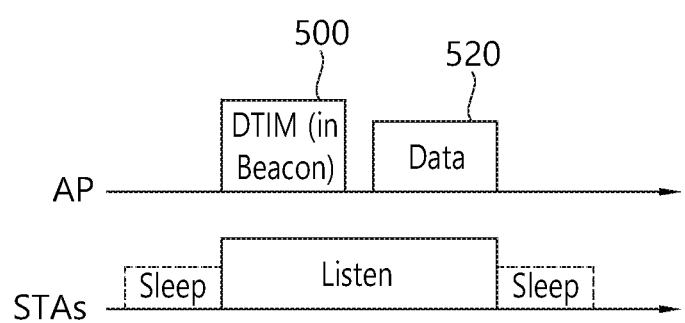
FIG. 5 is a conceptual diagram showing a power saving method based on a beacon frame.

FIG. 5 is a conceptual view showing a beacon frame based power saving method.

FIG. 5 discloses a case when a DTIM is delivered through a beacon frame 500. The beacon frame 500 may include a DTIM. As described above, the DTIM may indicate the presence of pending downlink data that are to be transmitted based on broadcast/multicast.

Referring to FIG. 5, the AP may transmit a beacon frame 500 including a DTIM to the STA. After receiving the beacon frame 500 including the DTIM, the STA may maintain the awake state without transmitting the PS-poll frame and may monitor the transmission of the downlink frame 520. The AP may transmit the downlink frame 520 to the STA by using the multicast method or the broadcast method.

In a WLAN system, an STA may operate based on a TXOP power saving mode, that is, a power saving mode based on TXOP, in addition to the aforementioned power saving mode based on a TIM.

The power management mode of an STA may be divided into an active mode and a power saving mode. The aforementioned power saving mode based on a TIM is one of power saving modes.

The TXOP power saving mode is one of active modes. In general, an STA operating in the active mode maintains an awake state, but an STA operating in the active mode may also switch to a doze state for TXOP duration for the transmission of a frame by another STA if a medium for the transmission of a frame by another STA is busy.

If an STA operates in the TXOP power saving mode, the STA may receive a downlink frame from an AP associated therewith, and may determine whether it will switch to a doze state or maintain an awake state based on a group identifier (ID) and a partial association identifier (AID) included in the PHY header (or PLCP header) of a downlink PPDU on which the downlink frame has been delivered.

For example, if a group identifier included in the PHY header of a received downlink PPDU is not identical with the group identifier of an STA, the STA may switch to a doze state. Furthermore, if a group identifier included in the PHY header of a received downlink PPDU is identical with the group identifier of an STA, but a PAID included in the PHY header of the downlink PPDU is not identical with the PAID of the STA, the STA may switch to a doze state.

An AP operating in a WLAN system may transmit data on overlapped time resources to each of a plurality of STAs. If transmission from an AP to an STA is called DL transmission, such transmission of the AP may be represented as a term called downlink multi-user transmission (or DL MU transmission). In contrast, DL single user (SU) transmission may be DL transmission from an AP to a single STA on the entire transmission resources.

In an existing WLAN system, an AP may perform DL MU transmission based on multiple input multiple output (MU MIMO), and such transmission may be represented as a term called DL MU MIMO transmission. In an embodiment of the present invention, an AP may perform DL MU transmission based on orthogonal frequency division multiple access (OFDMA), and such transmission may be represented as a term called DL MU OFDMA transmission. If DL MU OFDMA transmission is performed, an AP may transmit downlink data (or a downlink frame or a downlink PPDU) to each of a plurality of STAs through each of a plurality of frequency resources (or a plurality of subbands (or subchannels)) on overlapped time resources. DL MU OFDMA transmission may be used along with DL MU MIMO transmission. For example, DL MU-MIMO transmission may be performed based on a plurality of space-time streams (or spatial streams) on a specific subband (or subchannel) allocated for DL MU OFDMA transmission.

A PPDU, a frame, and data transmitted based on DL transmission may be represented as a term called a downlink PPDU, a downlink frame, and downlink data, respectively. The PPDU may be a data unit including a PPDU header and a physical layer service data unit (PSDU) (or a MAC protocol data unit (MPDU) or MAC payload). The PPDU header may include a PHY header and a PHY preamble. The PSDU (or MPDU) may be a data unit including a frame or a frame. The PSDU may also be represented as a term called a data field or MAC payload.

In contrast, transmission from an STA to an AP may be called UL transmission. Data transmission from a plurality of STAs to an AP on overlapped time resources may be represented as a term called uplink multi-user transmission (or UL MU transmission). UL SU transmission may indicate UL transmission from one STA to one AP on the entire transmission resources. Unlike in an existing WLAN system in which only UL SU transmission is permitted, in a WLAN system according to an embodiment of the present invention, UL MU transmission may also be supported. A PPDU, a frame, and data transmitted in uplink may be represented as terms called an UL PPDU, an UL frame, and UL data, respectively. UL transmission by each of a plurality of STAs may be performed on a frequency domain or a spatial domain.

If UL transmission by each of a plurality of STAs is performed on a frequency domain, different frequency resources (subbands or subchannels) may be allocated to a plurality of STAs as UL transmission resources based on OFDMA. The plurality of STAs may transmit UL data to an AP through the allocated different frequency resources. Such a transmission method through different frequency resources may be represented as a term called an UL MU OFDMA transmission method.

If UL transmission by each of a plurality of STAs is performed on a spatial domain, different space-time streams (or spatial streams) may be allocated to the plurality of STAs, and each of the plurality of STAs may transmit UL data to an AP through a different space-time stream. Such a transmission method through different spatial streams may be represented as a term called an UL MU MIMO transmission method.

UL MU OFDMA transmission and UL MU MIMO transmission may be performed together. For example, UL MU MIMO transmission based on a plurality of space-time streams (or spatial streams) may be performed on a specific subband (or subchannel) allocated for UL MU OFDMA transmission.

A subband may be a minimum frequency resource unit for DL MU OFDMA transmission/UL MU OFDMA. All of frequency resources may include at least one channel, and one channel may include at least one subband. A subband may have the same bandwidth size as a channel, or a plurality of subbands may be included in one channel.

Hereinafter, the present invention discloses a method for transmitting, by a plurality of STAs operating in a power saving mode based on a TIM, a PS-poll frame based on UL MU transmission. If UL MU transmission of a PS-poll frame according to an embodiment of the present invention is used, channel efficiency can be improved and a contention between STAs can be reduced.

As described above, an STA operating in a power saving mode based on a TIM may periodically switch to an awake state depending on the transmission cycle of a beacon frame, and may receive a beacon frame. The STA may check a TIM element included in the beacon frame and may check whether data pending in an AP is present or not based on bits included in a virtual bitmap within the TIM element. If a bit that belongs to the bits included in the virtual bitmap and that indicates the data pending in the AP (or in the case of a positive traffic indication), the STA may transmit a PS-poll frame to the AP in an awake state based on the virtual bitmap.

In accordance with an embodiment of the present invention, an AP may indicate an STA that belongs to a plurality of STAs which has received a positive traffic indication and that will transmit a PS-poll frame based on UL MU transmission, based on the virtual bitmap of a TIM element. The plurality of STAs which has been instructed to transmit a PS-poll frame by the AP may transmit the PS-poll frame based on UL MU OFDMA transmission or UL MU MIMO transmission.

In accordance with an embodiment of the present invention, an AP may schedule or induce the UL MU transmission of a PS-poll frame by a plurality of STAs which has downlink data pending in the AP based on an implicit method or an explicit method.

Figure 6:
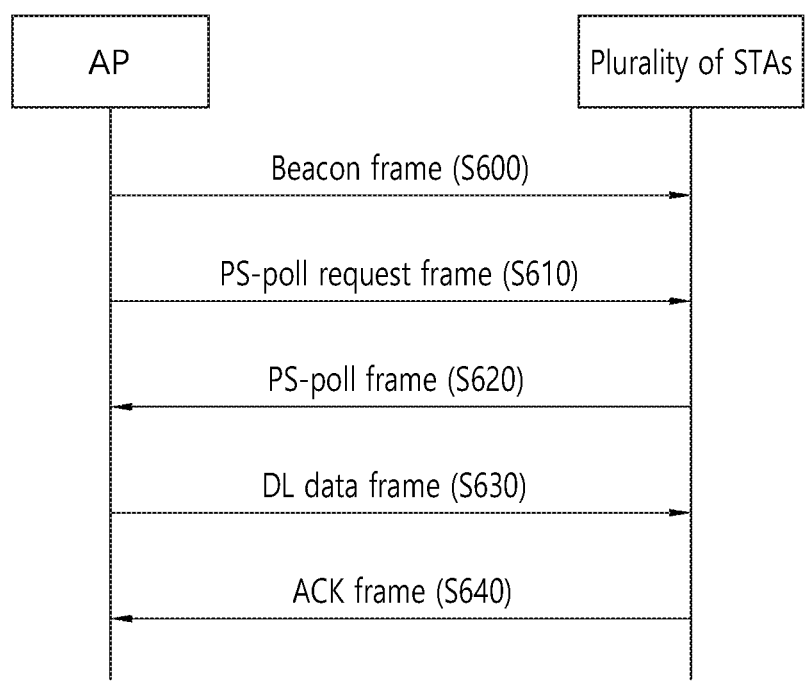
FIG. 6 is a flowchart illustrating a method for transmitting a PS-poll frame based on UL MU OFDMA transmission according to an embodiment of the present invention.

FIG. 6 is a flowchart illustrating a method for transmitting a PS-poll frame based on UL MU OFDMA transmission according to an embodiment of the present invention.

FIG. 6 discloses a method for indicating, by an AP, an STA that will transmit a PS-poll frame using an implicit method.

Referring to FIG. 6, the AP transmits a beacon frame (step S600).

The AP may transmit the beacon frame, including a TIM element indicating whether pending downlink data is present or not with respect to a plurality of associated STAs, to the plurality of STAs. Each of the plurality of STAs may check the presence of downlink data pending in the AP based on the TIM element.

A plurality of target STAs that belongs to the plurality of STAs and has downlink data pending in the AP may correspond to respective PS-poll frame transmission sequence numbers based on a virtual bitmap included in the TIM element. A target STA may be used as a term indicative of an STA having downlink data pending in the AP.

The virtual bitmap includes N bits. Each of the N bits may indicate whether pending downlink data is present or not for each of the plurality of STAs. Bit numbers may be sequentially allocated to the respective N bits included in the virtual bitmap. Each of the N bits included in the virtual bitmap may indicate the presence of pending downlink data with respect to an STA corresponding to a bit number. For example, a bit number 0 may be allocated to the most significant bit (MSB) of the virtual bitmap, and bit numbers may be sequentially allocated, and thus a bit number N−1 may be allocated to the least significant bit (LSB) of the virtual bitmap. If a bit corresponding to a bit number x is 1, the presence of pending downlink data may be indicated with respect to an STA having an association identifier (AID) corresponding to the bit number x.

Each of the plurality of target STAs may determine each PS-poll frame transmission sequence number (or sequence number) for transmitting a PS-poll frame based on the virtual bitmap included in the received TIM element.

If the transmission of PS-poll frames by four target STAs is permitted on overlapped time resources based on UL MU OFDM transmission, bits that belong to the N bits included in the virtual bitmap and that indicate the presence of pending downlink data (hereinafter referred to as "bits indicative of 1") may be sequentially grouped every four bits to form at least one bit group. As an allocated bit number is increased, four bits sequentially indicative of 1 may be grouped into one bit group. A PS-poll frame transmission sequence number may be assigned to each of the bit groups, and the bit group may be identified based on the PS-poll frame transmission sequence number. The formation of a bit group including four bits is one example. The number of bits included in a bit group may be changed depending on the number of STAs capable of UL MU transmission.

Each of the plurality of target STAs may determine a bit group including bits that are included in the virtual bitmap and that correspond to the plurality of target STAs, respectively, and may determine the PS-poll frame transmission sequence number of the determined bit group to be the PS-poll frame transmission sequence number of the plurality of target STAs.

For example, 16 bits indicative of 1 may be present in a virtual bitmap, and each of the 16 bits may indicate pending downlink data with respect to each of 16 target STAs. The 16 bits that are included in the virtual bitmap and are indicative of 1 may be sequentially grouped into four-bit groups according to their bit numbers. Four PS-poll frame transmission sequences may be allocated to the four-bit groups, respectively. Accordingly, the 16 target STAs may correspond to the PS-poll frame transmission sequences.

The beacon frame may further include information about whether the transmission of a PS-poll frame based on a PS-poll request frame is to be performed. In a conventional technology, after receiving a beacon frame, a target STA transmits a PS-poll frame by performing contention-based channel access without receiving a PS-poll request frame in order to receive pending downlink data. Accordingly, in order to request only the transmission of a PS-poll frame for a PS-poll transmission group based on a PS-poll request frame according to an embodiment of the present invention, PS-poll request information may be previously included in a beacon frame. The PS-poll request information may indicate the transmission of the PS-poll frame based on the PS-poll request frame.

The PS-poll request information may be information of 1 bit.

If PS-poll request information is 0, after a beacon frame is transmitted, an AP may indicate that a PS-poll request frame is not separately transmitted. In this case, a plurality of target STAs may obtain a medium by performing contentions-based channel access and may directly transmit a PS-poll frame without receiving a PS-poll request frame. In contrast, if the PS-poll request information is 1, after the transmission of a beacon frame, the transmission of a PS-poll request frame by an AP may be indicated. In this case, each of the plurality of target STAs may determine each of PS-poll frame transmission sequence numbers based on a TIM element. Each of the plurality of target STAs may transmit a PS-poll frame to the AP if a PS-poll frame transmission sequence number indicated by the PS-poll request frame transmitted by the AP is the same as the determined PS-poll frame transmission sequence number of each of the plurality of target STAs.

Hereinafter, an embodiment of the present invention discloses a method for requesting, by an AP, only a plurality of target STAs, corresponding to a specific PS-poll frame transmission sequence number, from the transmission of a PS-poll frame based on a PS-poll request frame.

The AP transmits a PS-poll request frame (step S610).

The AP may transmit a PS-poll request frame for triggering the transmission of a PS-poll frame by the plurality of target STAs corresponding to a specific PS-poll frame transmission sequence. The PS-poll request frame may be transmitted on the entire channel bandwidth for DL MU transmission after the transmission of the beacon frame. The PS-poll request frame may be encoded and transmitted on the entire channel bandwidth in a channel unit or may be encoded on the entire channel bandwidth and transmitted on the entire channel bandwidth.

The PS-poll request frame may include information about a PS-poll frame transmission sequence number. The information about a PS-poll frame transmission sequence number may indicate a plurality of target STAs which will transmit PS-poll frames. More specifically, the PS-poll frame transmission sequence number may indicate a specific bit group of a virtual bitmap, and a plurality of target STAs corresponding to bits included in a specific bit group may be indicated.

Hereinafter, in an embodiment of the present invention, a plurality of target STAs corresponding to a PS-poll frame transmission sequence number indicated by a PS-poll request frame is represented as a term called a PS-poll transmission STA group. Each of the plurality of target STAs may be represented as a term called a PS-poll transmission STA.

The AP receives a PS-poll frame transmitted by each of a plurality of STAs based on UL MU OFDMA transmission in response to the PS-poll request frame (step S620).

Each of the plurality of PS-poll transmission STAs may transmit the PS-poll frame through an allocated channel (or a subband (subchannels)) as a response to the PS-poll request frame. Each of the plurality of PS-poll transmission STAs may determine a channel through which the PS-poll frame is to be transmitted using a predetermined method.

Each of the plurality of PS-poll transmission STAs may determine a channel through which each of the plurality of PS-poll frames is to be transmitted based on ID information (e.g., an AID). For example, as the AID of a PS-poll transmission STA is relatively smaller, a channel corresponding to a relatively lower frequency band may be allocated to a PS-poll transmission STA.

For example, if the transmission of a PS-poll frame by a PS-poll transmission STA group 1 is required based on a PS-poll frame transmission sequence number indicated by a PS-poll request frame, a PS-poll transmission STA1, a PS-poll transmission STA2, a PS-poll transmission STA3, and a PS-poll transmission STA4 included in the PS-poll transmission STA group 1 may transmit PS-poll frames based on UL MU OFDMA transmission on overlapped time resources through a channel 1 to a channel 4, respectively. It may be assumed that the AID of the PS-poll transmission STA1 is 1, the AID of the PS-poll transmission STA2 is 2, the AID of the PS-poll transmission STA3 is 3, the AID of the PS-poll transmission STA4 is 4, the channel 1 is a frequency resource allocated to the lowest frequency band, and the channel 2, the channel 3, and the channel 4 have been allocated on continuous frequency bands. In this case, the channel 1 may be allocated to the PS-poll transmission STA1, and the PS-poll transmission STA1 may transmit a PS-poll frame1 included in an UL MU PPDU on the allocated channel 1. The channel 2 may be allocated to the PS-poll transmission STA2, and the PS-poll transmission STA2 may transmit a PS-poll frame2 included in the UL MU PPDU on the allocated channel 2. The channel 3 may be allocated to the PS-poll transmission STA3, and the PS-poll transmission STA3 may transmit a PS-poll frame3 included in the UL MU PPDU on the allocated channel 3. The channel 4 may be allocated to the PS-poll transmission STA4, and the PS-poll transmission STA4 may transmit a PS-poll frame4 included in the UL MU PPDU on the allocated channel 4.

A target STA other than a PS-poll transmission STA may switch to a doze state during the reception procedure of a downlink frame based on the PS-poll frame of a PS-poll transmission STA. That is, only a PS-poll transmission STA that belongs to target STAs and that receives a downlink frame by transmitting a PS-poll frame may maintain an awake state. If a downlink frame reception procedure according to an embodiment of the present invention is used, unnecessary power consumption of the STA can be reduced.

The AP transmits a plurality of downlink frames to the plurality of PS-poll transmission STAs based on DL MU transmission in response to the plurality of PS-poll frames transmitted based on UL MU OFDMA transmission (step S630).

The AP may transmit the plurality of downlink frames, including pending downlink data, to the plurality of PS-poll transmission STAs, respectively, based on DL MU OFDMA transmission in response to the plurality of PS-poll frames received at step S620. In other words, the AP may transmit a DL MU PPDU for carrying the plurality of downlink frames, including pending downlink data, to the plurality of PS-poll transmission STAs, respectively, based on DL MU OFDMA transmission in response to the plurality of PS-poll frames received at step S620.

The PPDU header of the DL MU PPDU may include information about DL resources allocated to the plurality of PS-poll transmission STAs, respectively. Each of the plurality of PS-poll transmission STAs may receive downlink data pending in the AP through the downlink frame transmitted on a DL resource allocated by the PPDU header of the DL MU PPDU.

The AP receives ACK frames transmitted in response to the plurality of downlink frames (step S640).

The plurality of PS-poll transmission STAs that has received the plurality of downlink frames, respectively, may transmit the ACK frames to the AP in response to the plurality of downlink frames carried through the DL MU PPDU. The plurality of PS-poll transmission STAs may transmit the ACK frames for the plurality of downlink frames based on UL MU transmission.

Figure 7:
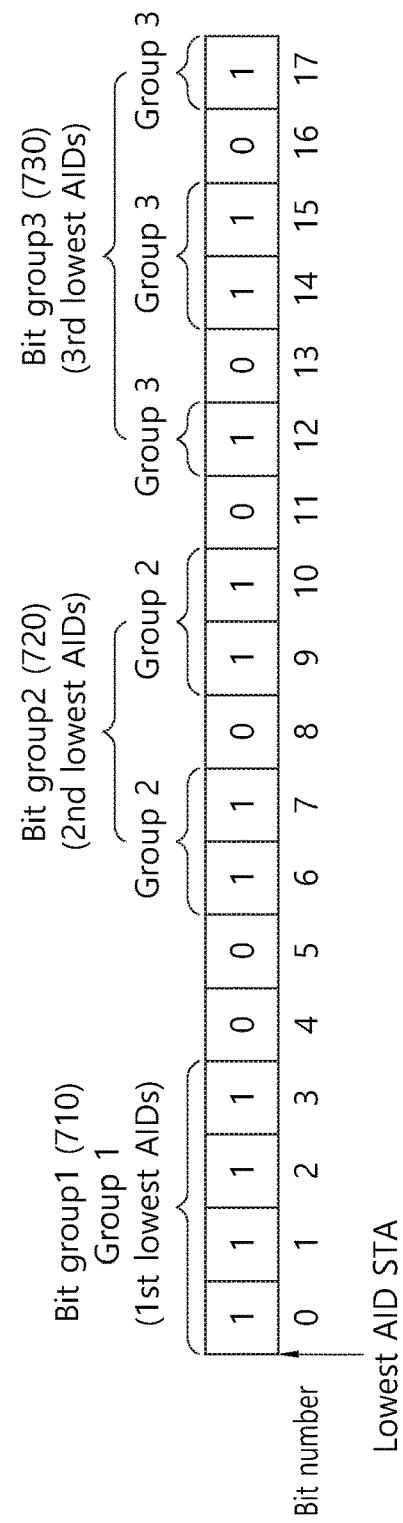
FIG. 7 is a conceptual diagram showing STA grouping based on a TIM element according to an embodiment of the present invention.

FIG. 7 is a conceptual diagram showing STA grouping based on a TIM element according to an embodiment of the present invention.

FIG. 7 discloses a method for grouping a plurality of bits, included in a virtual bitmap included in a TIM element, into a bit group.

Referring to FIG. 7, there is disclosed a virtual bitmap including 18 bits. A bit number is allocated to each of the 18 bits included in the virtual bitmap, and the 18 bits may correspond to 18 STAs associated with an AP, respectively.

It may be assumed that the smallest bit number is allocated to a bit that belongs to the plurality of bits included in the virtual bitmap and that is placed on the left (or the most significant bit (MSB)), bit numbers are sequentially allocated, and the greatest bit number is allocated to a bit that belongs to the plurality of bits included in the virtual bitmap and that is placed on the right (or the least significant bit (LSB)). The bit having the smallest bit number may correspond to an STA that belongs to STAs associated with an AP and that has the smallest AID. Bit numbers and AIDs may sequentially correspond to each other, and thus a bit having the greatest bit number may correspond an STA that belongs to the STAs associated with the AP and that has the greatest AID. Alternatively, a bit having a bit number n may correspond to an STA having an AID n, indicating that pending downlink data is present in the STA.

In accordance with an embodiment of the present invention, whether the value of a bit is 1 or not may be determined in increasing order of bit numbers from a bit corresponding to a bit number 0, and thus n bits (e.g., n=4) may be grouped into one bit group. As in FIG. 7, since the bit values of bits corresponding to bit numbers 0, 1, 2, and 3 indicate 1, the bits may be grouped into one bit group 1 710. Since the bit values of bits corresponding to bit numbers 6, 7, 9, and 10 indicate 1, the bits may be grouped into one bit group 2 720. Furthermore, since the bit values of bits corresponding to bit numbers 12, 14, 15, and 17 indicate 1, the bits may be grouped into one bit group 3 730.

Each of the plurality of bit groups may correspond to a PS-poll frame transmission sequence number. For example, the bit group 1 710 may correspond to a PS-poll frame transmission sequence number1, the bit group 2 720 may correspond to a PS-poll frame transmission sequence number2, and the bit group 3 730 may correspond to a PS-poll frame transmission sequence number3.

Each of the plurality of target STAs may obtain information about a PS-poll frame transmission sequence number, corresponding to each of the plurality of target STAs, based on a bit corresponding to each of the plurality of target STAs included in the virtual bitmap. For example, if the AID of the target STA1 corresponds to a bit of the bit number 0, the target STA1 may be aware that it corresponds to the PS-poll frame sequence1 based on bit information included in the virtual bitmap.

Thereafter, each of the plurality of target STAs may determine whether or not to transmit a PS-poll frame based on information about the PS-poll frame transmission sequence number included in the PS-poll request frame. For example, if the PS-poll frame transmission sequence number information included in the PS-poll request frame indicates the PS-poll frame transmission sequence number1, the target STA1 may transmit the PS-poll frame in response to the PS-poll request frame.

Figure 8:
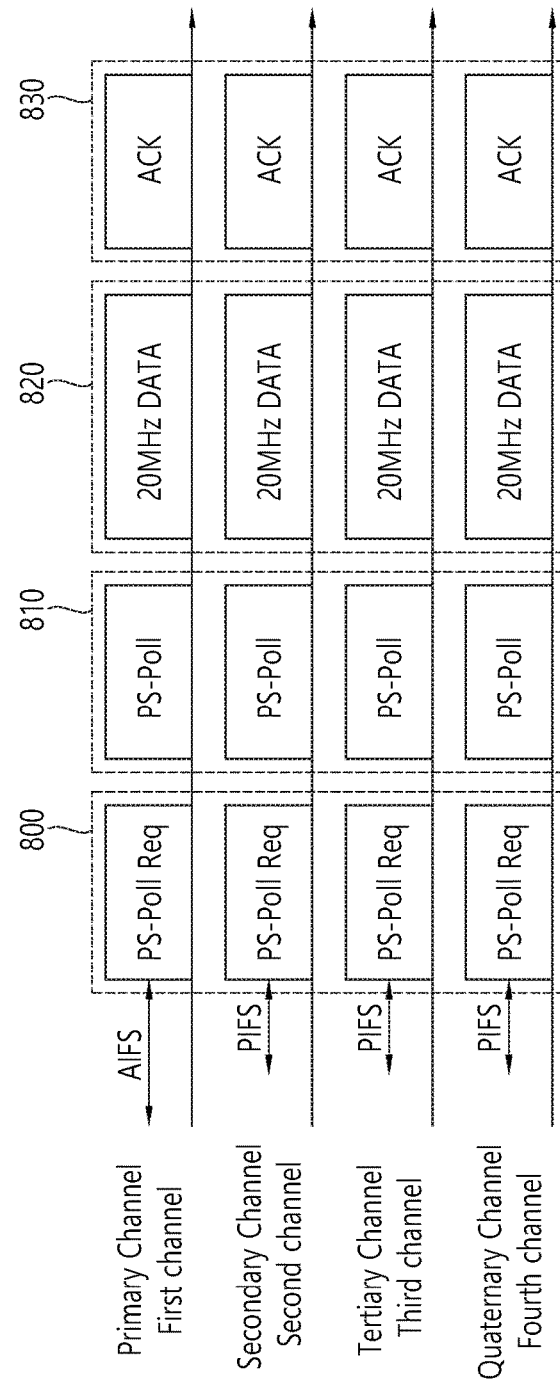
FIG. 8 is a flowchart illustrating a method for transmitting a PS-poll frame based on UL MU OFDMA transmission according to an embodiment of the present invention.

FIG. 8 is a flowchart illustrating a method for transmitting a PS-poll frame based on UL MU OFDMA transmission according to an embodiment of the present invention.

FIG. 8 discloses a method for transmitting, by each of a plurality of target STAs, a PS-poll frame based on UL MU OFDMA transmission after the transmission of a beacon frame. FIG. 8 discloses the transmission of a data frame of a channel unit in UL MU transmission and DL MU transmission, for convenience of a description, but the channel may be interpreted as a subband. The subband may have the same bandwidth as the channel or a plurality of subbands may be included in a single channel. In FIG. 8, a single channel may have a 20 MHz bandwidth.

An AP may transmit a beacon frame including a TIM element. Each of a plurality of target STAs may obtain information about the PS-poll frame transmission sequence of each of the plurality of target STAs based on a virtual bitmap included in the TIM element.

The AP may transmit a PS-poll request frame 800 after the transmission of the beacon frame.

The AP may transmit the PS-poll request frame 800, encoded in a channel unit, based on a DL MU PPDU format through each of a plurality of channels. Alternatively, the PS-poll request frame 800 may be transmitted through each of a plurality of channels in a duplicate format. It is hereinafter assumed that the PS-poll request frame 800 is carried through a DL MU PPDU format.

If the AP transmits the PS-poll request frames through four channels (a primary channel (hereinafter referred to as a "channel 1"), a secondary channel (hereinafter referred to as a "channel 2"), a tertiary channel (hereinafter referred to as a "channel 3"), and a quaternary channel (hereinafter referred to as a "channel 4")), the AP may discover whether the four channels are available. For example, during the time corresponding to an arbitration inter-frame space (AIFS) with respect to the channel 1, the AP may determine whether the channels 2, 3, and 4 are available during the time corresponding to a point coordination function (PCF) interframe space (PIFS) with respect to the channels 2, 3, and 4. It is hereinafter assumed that all of the four channels are available.

The AP may transmit the PS-poll request frames 800 to the plurality of target STAs through the respective channels based on the DL MU PPDU format.

Each of the plurality of target STAs may determine whether or not to transmit a PS-poll frame 810 based on information about a PS-poll frame transmission sequence number included in the received PS-poll request frame 800.

Each of the plurality of target STAs may determine whether the PS-poll frame transmission sequence number included in the received PS-poll request frame 800 corresponds to the PS-poll frame transmission sequence number of each of the plurality of target STAs. More specifically, if a bit corresponding to each of the plurality of target STAs is included in a bit group corresponding to the PS-poll frame transmission sequence number included in the received PS-poll request frame 800, each of the plurality of target STAs may transmit the PS-poll frame 810 to the AP. In other words, if its own PS-poll frame transmission sequence number determined based on the TIM element included in the beacon frame is the same as a PS-poll frame transmission sequence number included in the PS-poll request frame 800, each of the plurality of target STAs may transmit the PS-poll frame 810 to the AP. A frame interval between the PS-poll request frame 800 and the PS-poll frame 810 may be a short interframe space (SIFS).

That is, a plurality of PS-poll transmission STAs that belongs to a plurality of target STAs and that corresponds to PS-poll frame transmission sequence numbers included in the PS-poll request frames 800 may transmit the PS-poll frames 810 to the AP. The plurality of PS-poll transmission STAs may transfer the plurality of PS-poll frames 810 to the AP through an UL MU PPDU. Each of the PS-poll transmission STAs may determine a channel through which the PS-poll frame 810 is to be transmitted based on a predetermined method. For example, as the AID of a PS-poll transmission STA is relatively smaller, a channel corresponding to a relatively lower frequency band may be allocated to the PS-poll transmission STA. For example, an STA that belongs to the four STAs corresponding to a specific PS-poll frame transmission sequence number and that corresponds to the smallest AID may transmit the PS-poll frame 810 through the channel 1. Channels may be sequentially allocated to the remaining STAs. An STA that belongs to the four STAs corresponding to a specific PS-poll frame transmission sequence number and that corresponds to the greatest AID may transmit the PS-poll frame 810 through the channel 4.

The AP may transmit a plurality of DL data frames 820 to the plurality of PS-poll transmission STAs, respectively, in response to the PS-poll frames 810. More specifically, the AP may transfer the plurality of DL data frames 820 to the plurality of PS-poll transmission STAs, respectively, through the DL MU PPDU. The channel through which the DL data frame 820 is transmitted may be determined by taking into consideration the AID of each of the plurality of PS-poll transmission STAs or may be indicated by the AP based on the PPDU header of the DL MU PPDU. For example, an STA that belongs to the four STAs corresponding to a specific PS-poll frame transmission sequence number and that corresponds to the smallest AID may receive the DL data frame 820 through the channel 1, channels may be sequentially allocated to the STAs, and an STA that belongs to the four STAs corresponding to a specific PS-poll frame transmission sequence number and that corresponds to the greatest AID may receive the DL data frame 820 through the channel 4. Alternatively, the PPDU header of the DL MU PPDU for transferring the plurality of DL data frames 820 may include information about the reception frequency resources (or channel) of the DL data frame 820 each of the plurality of PS-poll transmission STAs.

Each of the plurality of PS-poll transmission STAs may transmit an ACK frame 830 to the AP in response to each of the plurality of DL data frames 820.

Figure 9:
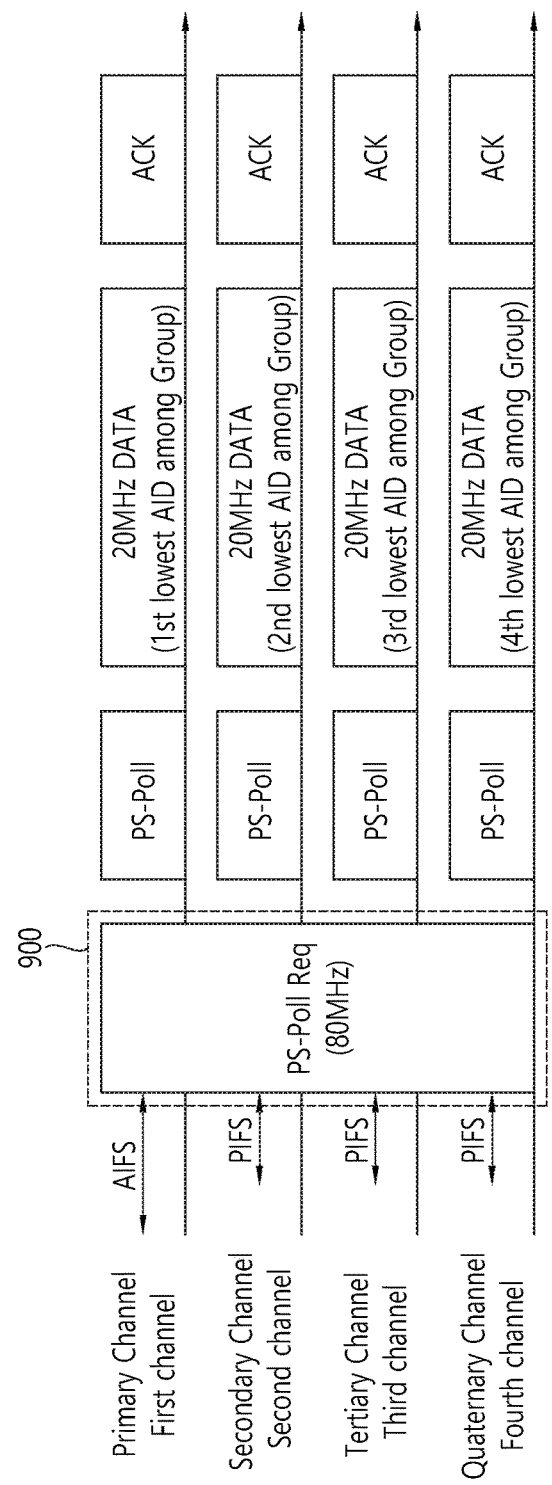
FIG. 9 is a conceptual diagram showing a method for transmitting a PS-poll frame based on UL MU OFDMA transmission according to an embodiment of the present invention.

FIG. 9 is a conceptual diagram showing a method for transmitting a PS-poll frame based on UL MU OFDMA transmission according to an embodiment of the present invention.

FIG. 9 discloses a method for transmitting, by each of a plurality of target STAs, a PS-poll frame based on UL MU OFDMA transmission after the transmission of a beacon frame. FIG. 9 discloses a case where a PS-poll request frame 900 is transmitted on the entire channel band and one channel is 20 MHz.

An AP may transmit a beacon frame including a TIM element. Each of a plurality of target STAs may obtain information about the PS-poll frame transmission sequence of each of the plurality of target STAs based on a virtual bitmap included in the TIM element.

The AP may transmit the PS-poll request frame 900 after the transmission of the beacon frame.

The AP may transmit the PS-poll request frame 900, encoded in a full channel band unit, through a full channel band (e.g., 80 MHz) including a plurality of channels.

In order to transmit the PS-poll request frame 900 on the entire channel band (a channel 1~a channel 4), the AP may discover whether the four channels are available. For example, during the time corresponding to an AIFS with respect to the channel 1, the AP may determine whether the channels 2, 3, and 4 are available during the time corresponding to a PIFS with respect to the channels 2, 3, and 4. If all of the four channels are available, the AP may transmit the PS-poll request frame 900 on the entire channel bandwidth (80 MHz) including the channel 1 to the channel 4.

A subsequent procedure is the same as that disclosed in FIG. 8.

Figure 10:
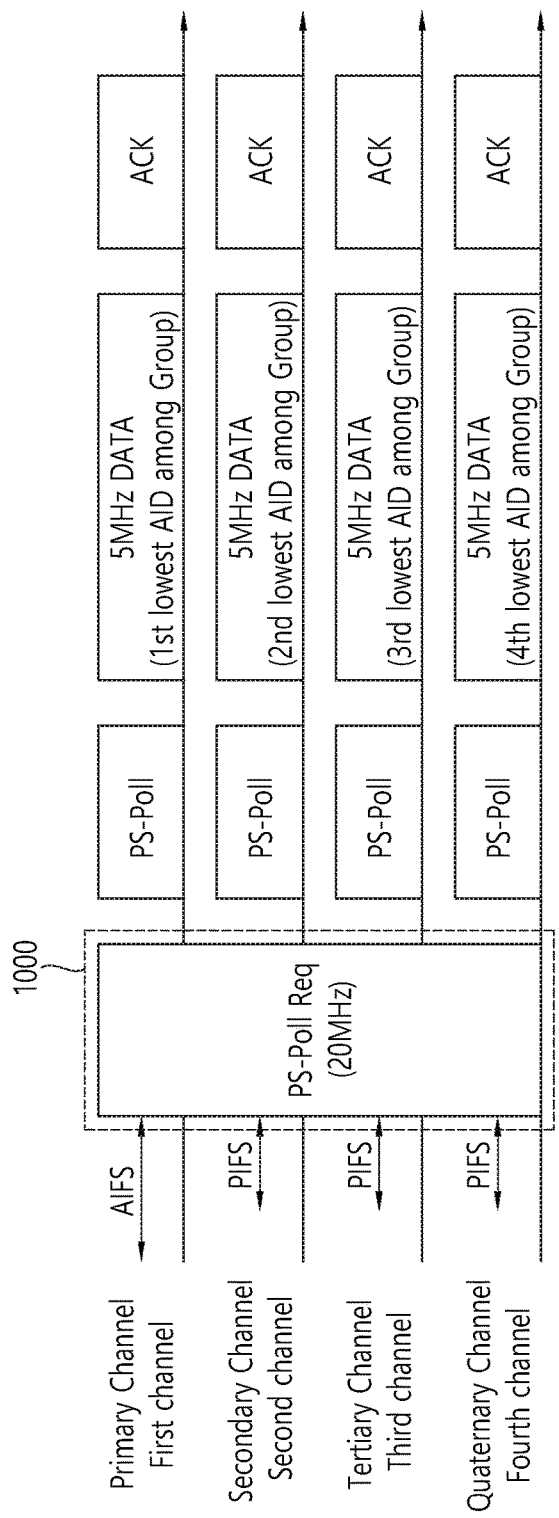
FIG. 10 is a conceptual diagram showing a method for transmitting a PS-poll frame based on UL MU OFDMA transmission according to an embodiment of the present invention.

FIG. 10 is a conceptual diagram showing a method for transmitting a PS-poll frame based on UL MU OFDMA transmission according to an embodiment of the present invention.

FIG. 10 discloses a method for transmitting, by each of a plurality of target STAs, a PS-poll frame based on UL MU OFDMA transmission after the transmission of a beacon frame. FIG. 10 discloses a case where a PS-poll request frame 1000 is transmitted on the entire channel band and one channel is 5 MHz.

An AP may transmit a beacon frame including a TIM element. Each of the plurality of target STAs may obtain information about the PS-poll frame transmission sequence of each of the plurality of target STAs based on a virtual bitmap included in the TIM element.

The AP may transmit the PS-poll request frame 1000 after the transmission of the beacon frame.

The AP may transmit the PS-poll request frame 1000, encoded in a full channel band unit, through a full channel band (e.g., 20 MHz) including a plurality of channels.

As described above, the AP may discover whether the four channels are available in order to transmit the PS-poll request frame 1000 on the full channel band (a channel 1~a channel 4). If the four channels are available, the AP may transmit the PS-poll request frame 1000 on the full channel bandwidth (20 MHz) including the channel 1 to the channel 4.

A subsequent procedure is the same as that disclosed in FIG. 8.

Figure 11:
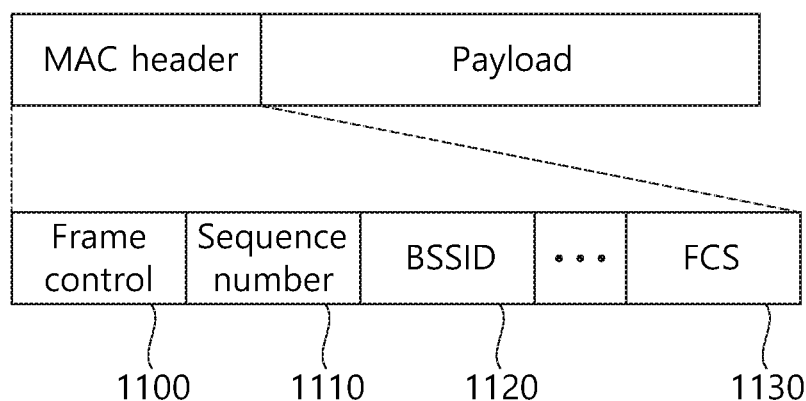
FIG. 11 is a conceptual diagram showing a PS-poll request frame according to an embodiment of the present invention.

FIG. 11 is a conceptual diagram showing a PS-poll request frame according to an embodiment of the present invention.

FIG. 11 discloses the structure of a PS-poll request frame.

Referring to FIG. 11, the PS-poll request frame may include a frame control field 1100, a sequence number field 1110, a basic service set identifier (BSSID) field 1120, and a frame check sequence (the FCS) 1130.

The frame control field 1100 may include information indicating that a transmitted frame is a PS-poll request frame.

The sequence number field 1110 may include information about a PS-poll frame transmission sequence number. As described above, the information about a PS-poll frame transmission sequence number may indicate a plurality of PS-poll transmission STAs that belongs to a plurality of target STAs and that will transmit PS-poll frames. More specifically, the PS-poll frame transmission sequence number may indicate a specific bit group of a virtual bitmap. Furthermore, a plurality of target STAs corresponding to a bit included in a specific bit group may be indicated based on the PS-poll frame transmission sequence number.

In other words, the sequence number field 1110 may include information about a sequence number (or a PS-poll frame transmission sequence number) mapped to a group number (or a bit group number), that is, a group of STAs configured as a positive traffic indication in a TIM element.

The BSSID field 1120 may include source address information indicative of a source (e.g., an AP) that has transmitted a PS-poll request frame.

The FCS 1130 may include information for checking whether a frame includes an error.

FIGS. 6 to 11 disclose a method for transmitting a PS-poll frame based on UL MU OFDMA using an implicit grouping method. Hereinafter, an embodiment of the present invention discloses a method for transmitting a PS-poll frame based on UL MU OFDMA using an explicit grouping method.

Figure 12:
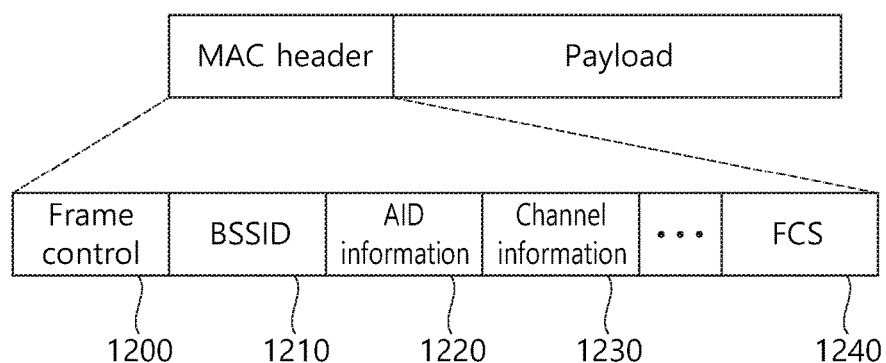
FIG. 12 is a conceptual diagram showing a PS-poll request frame for an explicit grouping method according to an embodiment of the present invention.

FIG. 12 is a conceptual diagram showing a PS-poll request frame for an explicit grouping method according to an embodiment of the present invention.

Referring to FIG. 12, a PS-poll request frame transmitted by an AP may include AID information directly indicative of a PS-poll transmission STA that belongs to target STAs and that will transmit a PS-poll frame. In the explicit grouping method, a PS-poll transmission STA is not implicitly indicated based on a PS-poll frame transmission sequence number, but a PS-poll transmission STA may be explicitly indicated based on AID information. The AID information is an example of information for indicating a PS-poll transmission STA, and another ID information may be used to indicate a PS-poll transmission STA.

The PS-poll request frame may include a frame control field 1200, a BSSID field 1210, an AID information field 1220, a channel information field 1230, and an FCS 1240.

The frame control field 1200 may include information indicating that a transmitted frame os a PS-poll request frame.

The BSSID field 1210 may include source address information indicative of a source (e.g., an AP) that has transmitted a PS-poll request frame.

The AID information field 1220 may include AID information indicative of a PS-poll transmission STA that belongs to target STAs and that will transmit a PS-poll frame. In other words, the AID information field 1220 may include information about the AID of an STA (PS-poll transmission STA) that has to transmit a PS-poll frame using address information, indicated based on a BSSID field, as a receiving address (RA). The AID information field 1220 may include a maximum of four AIDs.

The channel information field 1230 may include information about frequency resources (e.g., channels) for transmitting a plurality of PS-poll frames, respectively, by a plurality of PS-poll transmission STAs. For example, if the AID information field 1220 indicates four PS-poll transmission STAs, the channel information field 1230 may include information about frequency resources for the transmission of PS-poll frames of the four PS-poll transmission STAs, respectively. For example, the channel information field 1230 may include a channel number for indicating a maximum of four channels.

For example, the channel information field 1230 may include information sequentially indicating a plurality of channels. A plurality of channels sequentially indicated based on the channel information field 1230 may be sequentially mapped to a plurality of PS-poll transmission STAs sequentially indicated based on the AID information field 1220. For example, it may be assumed that an STA1, an STA2, an STA3, and an STA4 are sequentially indicated based on the AID information field 1220 and a channel 1, a channel 2, a channel 3, and a channel 4 are sequentially indicated based on the channel information field 1230. In this case, the channel 1 may be allocated to the STA1, the channel 2 may be allocated to the STA2, the channel 3 may be allocated to the STA3, and the channel 4 may be allocated to the STA4 as frequency resources for the transmission of PS-poll frames.

The FCS 1240 may include information for checking whether a frame has an error.

If the method for transmitting a PS-poll frame based on UL MU OFDMA using an explicit grouping method according to an embodiment of the present invention is used, a PS-poll transmission STA that will directly transmit a PS-poll frame may be indicated based on a PS-poll request frame without checking the PS-poll frame transmission sequence of an STA based on the TIM element of a beacon frame.

Figure 13:
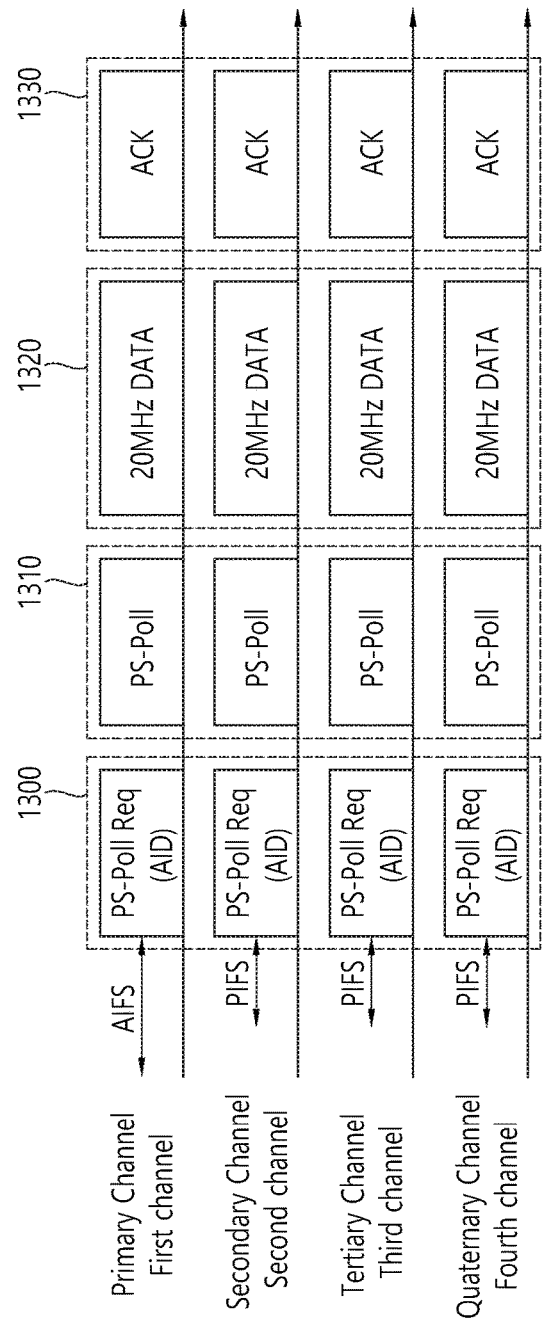
FIG. 13 is a conceptual diagram showing a method for transmitting a PS-poll frame based on UL MU OFDMA using an explicit grouping method according to an embodiment of the present invention.

FIG. 13 is a conceptual diagram showing a method for transmitting a PS-poll frame based on UL MU OFDMA using an explicit grouping method according to an embodiment of the present invention.

FIG. 13 discloses a method for transmitting a PS-poll frame based on UL MU OFDMA using an explicit grouping method after the transmission of a beacon frame. In FIG. 13, one channel may have a 20 MHz bandwidth.

An AP may transmit a beacon frame including a TIM element. Each of a plurality of STAs may check whether a pending downlink frame is present or not based on a virtual bitmap included in the TIM element. An STA operating in a power saving mode based on a TIM may switch to a doze state if the presence of a pending downlink frame is not indicated based on a virtual bitmap included in a TIM element.

A target STA in which the presence of a pending downlink frame is indicated based on a virtual bitmap included in a TIM element may monitor the transmission of a PS-poll request frame 1300 while maintaining an awake state.

The AP may transmit the PS-poll request frame 1300. The AP may transmit the PS-poll request frames 1300 to target STAs through a channel 1 to a channel 4 based on a DL MU PPDU format. The PS-poll request frame 1300 may include information about each of a plurality of PS-poll transmission STAs that belongs to the target STAs and that will transmit a PS-poll frame 1310 and information about frequency resources for transmitting the PS-poll frame 1310 of each of the plurality of PS-poll transmission STAs.

A target STA that has received the PS-poll request frame 1300 may determine whether or not transmit the PS-poll frame 1310 based on information about the plurality of PS-poll transmission STAs included in the PS-poll request frame 1300.

A plurality of PS-poll transmission STAs that belongs to the target STAs and that will transmit the PS-poll frames 1310 may be determined based on information about the plurality of PS-poll transmission STAs included in the PS-poll request frames 1300. Each of the plurality of PS-poll transmission STAs may transmit the PS-poll frame 1310 based on UL MU OFDMA on a channel allocated based on information about frequency resources for the transmission of the PS-poll frame 1310 included in the PS-poll request frame 1300.

For example, it may be assumed that information about a plurality of PS-poll transmission STAs included in the PS-poll request frame 1300 indicate an STA1, STA2, STA3, and STA4 of target STAs and information about frequency resources for the transmission of the PS-poll frames 1310 by a plurality of PS-poll transmission STAs included in the PS-poll request frame 1300 indicate a channel 1, a channel 2, a channel 3, and a channel 4. In this case, the STA1 may transmit the PS-poll frame 1310 to the AP through the channel 1, the STA2 may transmit the PS-poll frame 1310 to the AP through the channel 2, the STA3 may transmit the PS-poll frame 1310 to the AP through the channel 3, and the STA4 may transmit the PS-poll frame 1310 to the AP through the channel 4 on overlapped time resources based on UL MU OFDMA.

The AP may receive the PS-poll frames 1310 from the plurality of PS-poll transmission STAs, respectively, and may transmit a plurality of DL data frames 1320 to the plurality of PS-poll transmission STAs, respectively.

The AP may transmit the DL data frames 1320 to the plurality of PS-poll transmission STAs, respectively, through the channel 1 to the channel 4 based on a DL MU PPDU format.

A channel through which the DL data frame 1320 is transmitted may be determined by taking into consideration the AID of each of the plurality of PS-poll transmission STAs or may be indicated by the AP based on the PPDU header of the DL MU PPDU. For example, the downlink frame 1320 pending in each of the plurality of PS-poll transmission STAs may be transmitted to each of the plurality of PS-poll transmission STAs on the same channel as a transport channel through which the PS-poll request frame 1300 has been transmitted to each of the plurality of PS-poll transmission STAs. Alternatively, the PPDU header of the DL MU PPDU for carrying the plurality of downlink frames 1320 may include information about the reception frequency resources of the downlink frame 1320 of each of the plurality of PS-poll transmission STAs.

Each of the plurality of PS-poll transmission STAs may transmit an ACK frame 1330 to the AP as a response to each of the plurality of DL data frames 1320.

Figure 14:
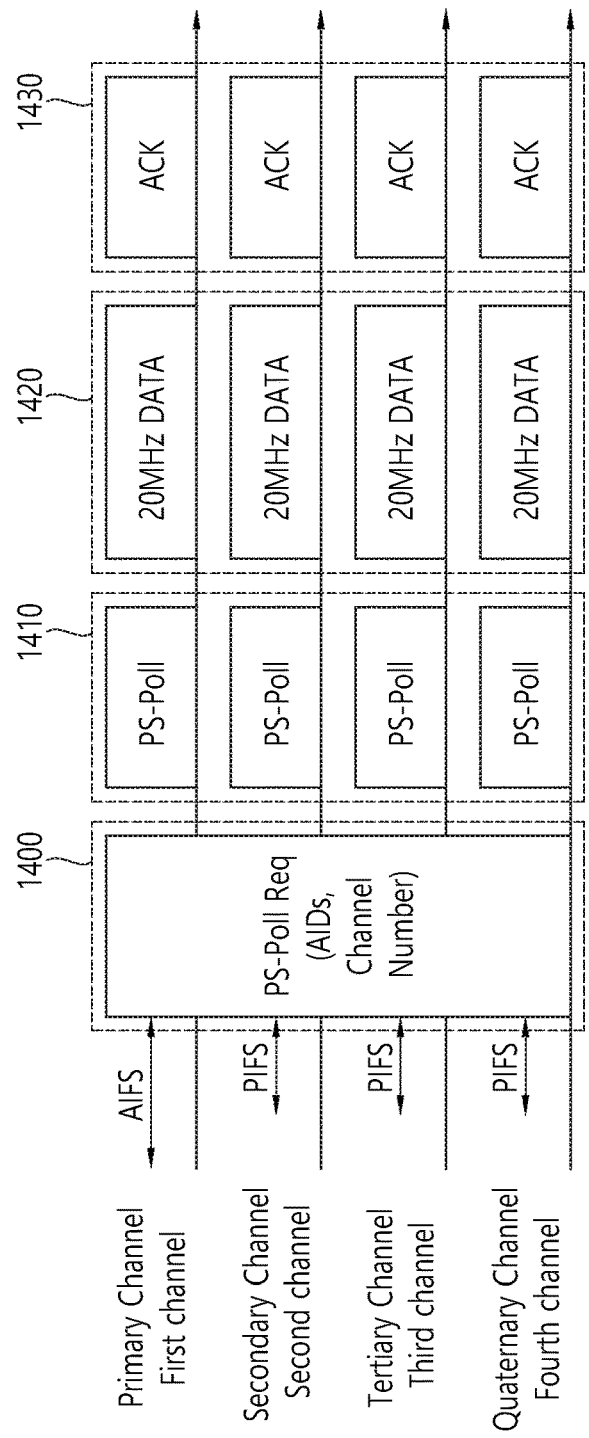
FIG. 14 is a conceptual diagram showing a method for transmitting a PS-poll frame based on UL MU OFDMA using an explicit grouping method according to an embodiment of the present invention.

FIG. 14 is a conceptual diagram showing a method for transmitting a PS-poll frame based on UL MU OFDMA using an explicit grouping method according to an embodiment of the present invention.

FIG. 14 discloses a method for transmitting a PS-poll frame based on UL MU OFDMA using an explicit grouping method after the transmission of a beacon frame. FIG. 14 discloses a case where a PS-poll request frame 1400 is transmitted on a full channel band and one channel is 20 MHz.

An AP may transmit a beacon frame including a TIM element. An STA that has received the beacon frame may determine whether it is a target STA based on the virtual bitmap included in the TIM element.

The AP may transmit the PS-poll request frame 1400 after the transmission of the beacon frame. The AP may transmit the PS-poll request frame 1400, encoded in a full channel band unit, through a full channel band including a plurality of channels (e.g., 80 MHz).

The AP may discover whether four channels are available in order to transmit the PS-poll request frame 1400 on a full channel band (a channel 1~a channel 4). For example, the AP may determine whether the channels 2, 3, and 4 are available during the time corresponding to a PIFS with respect to the channels 2, 3, and 4 during the time corresponding to an AIFS with respect to the channel 1. If all of the four channels are available, the AP may transmit the PS-poll request frame 1400 on the full channel bandwidth (80 MHz) including the channel 1 to the channel 4.

The AID field of the PS-poll request frame 1400 may include information about a plurality of PS-poll transmission STAs that belongs to target STAs and that will transmit PS-poll frames 1410. Furthermore, the channel information field of the PS-poll request frame 1400 may include information about frequency resources for the transmission of the PS-poll frame 1410 of each of the plurality of PS-poll transmission STAs. A subsequent procedure is the same as that disclosed in FIG. 13.

Figure 15:
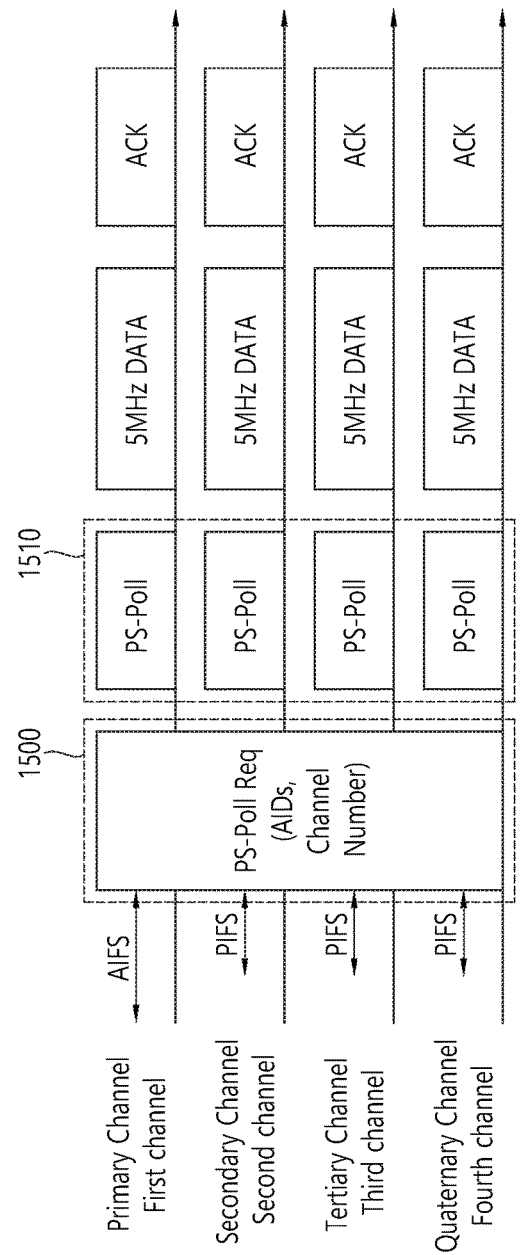
FIG. 15 is a conceptual diagram showing a method for transmitting a PS-poll frame based on UL MU OFDMA using an explicit grouping method according to an embodiment of the present invention.

FIG. 15 is a conceptual diagram showing a method for transmitting a PS-poll frame based on UL MU OFDMA using an explicit grouping method according to an embodiment of the present invention.

FIG. 15 discloses a method for transmitting, by each of a plurality of target STAs, a PS-poll frame based on UL MU OFDMA transmission after the transmission of a beacon frame. FIG. 15 discloses a case where a PS-poll request frame is transmitted on a full channel band and one channel is 5 MHz.

An AP may transmit a PS-poll request frame 1500 after the transmission of a beacon frame.

The AP may transmit the PS-poll request frame 1500, encoded in a full channel band unit, on a full channel band (e.g., 20 MHz) including a plurality of channels.

As described above, the AP may discover whether four channels are available in order to transmit the PS-poll request frame 1500 on the full channel band (a channel 1~a channel 4). If the four channels are available, the AP may transmit the PS-poll request frame on the full channel bandwidth (20 MHz) including the channel 1 to the channel 4.

The AID field of the PS-poll request frame 1500 may include information about a plurality of PS-poll transmission STAs that belongs to target STAs and that will transmit PS-poll frames 1510. Furthermore, the channel information field of the PS-poll request frame 1500 may include information about frequency resources (e.g., a subchannel of 5 MHz) for the transmission of the PS-poll frame 1510 of each of the plurality of PS-poll transmission STAs. A subsequent procedure is the same as that disclosed in FIG. 13.

FIGS. 6 to 15 have disclosed the methods for transmitting a PS-poll frame based on UL MU OFDMA using an implicit grouping method/explicit grouping method. Hereinafter, an embodiment of the present invention discloses a method for transmitting a PS-poll frame based on UL multiple input multiple output (MU MIMO) using an implicit grouping method/explicit grouping method.

Figure 16:
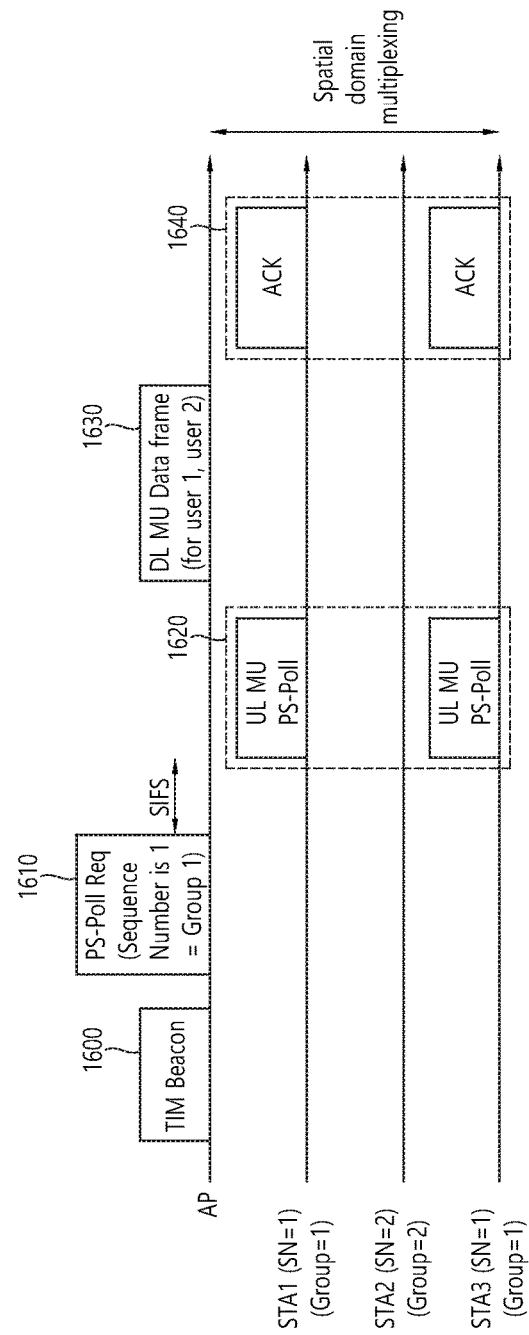
FIG. 16 is a conceptual diagram showing a method for transmitting a PS-poll frame based on UL MU OFDMA using an implicit grouping method according to an embodiment of the present invention.

FIG. 16 is a conceptual diagram showing a method for transmitting a PS-poll frame based on UL MU OFDMA using an implicit grouping method according to an embodiment of the present invention.

Referring to FIG. 16, in the method for transmitting a PS-poll frame based on UL MU OFDMA using an implicit grouping method, a plurality of target STAs may obtain information about their own PS-poll frame transmission sequence numbers based on a virtual bitmap included in the TIM element of a beacon frame 1600.

A plurality of PS-poll transmission STAs may be determined from the plurality of target STAs based on information about a PS-poll frame transmission sequence number included in a PS-poll request frame 1610 transmitted by an AP.

The plurality of PS-poll transmission STAs may transmit PS-poll frames 1620 to the AP. The plurality of PS-poll transmission STAs may transfer the plurality of PS-poll frames 1620 to the AP based on UL MU MIMO. If a PS-poll frame transmission sequence number indicated based on the PS-poll request frame 1610 is 1 as in FIG. 16, an STA1 and an STA3 whose PS-poll frame transmission sequence number is 1 may transmit the PS-poll frames 1620. Each of the PS-poll transmission STAs may determine a space-time stream in which the PS-poll frame 1620 is to be transmitted based on a predetermined method.

For example, as the AID of a PS-poll transmission STA is relatively smaller, the PS-poll frame 1620 may be transmitted through a space-time stream corresponding to a relatively smaller space-time stream index. An STA that belongs to four STAs corresponding to a specific PS-poll frame transmission sequence number and that corresponds to the smallest AID may transmit the PS-poll frame 1620 through a space-time stream1, space-time streams may be sequentially allocated, and an STA that belongs to the four STAs corresponding to a specific PS-poll frame transmission sequence number and that corresponds to the greatest AID may transmit the PS-poll frame 1620 through a space-time stream4.

Alternatively, in accordance with another embodiment of the present invention, the PS-poll request frame 1620 may include information about a space-time stream allocated to each of PS-poll transmission STAs. The information about a space-time stream allocated to each PS-poll transmission STA may include information about the number of space-time streams allocated to each of the PS-poll transmission STAs. The number of space-time streams in which the PS-poll frames 1620 will be sequentially transmitted may be determined based on the AIDs of the plurality of PS-poll transmission STAs.

For example, information about space-time streams allocated to a plurality of PS-poll transmission STAs, respectively, based on the PS-poll request frame 1610 may be (1, 1, 1, 1). In such a case, a space-time stream1 may be allocated to a PS-poll transmission STA that belongs to the plurality of PS-poll transmission STAs and that corresponds to the smallest AID. Space-time streams may be sequentially allocated to the plurality of PS-poll transmission STAs based on the sizes of AIDs. A space-time stream4 may be allocated to a PS-poll transmission STA that belongs to the plurality of PS-poll transmission STAs and that corresponds to the greatest AID may transmit the PS-poll frame 1620.

The AP may transmit a plurality of DL data frames to the plurality of PS-poll transmission STAs, respectively, as response to the PS-poll frames 1620. More specifically, the AP may transfer the plurality of DL data frames 1630 to the plurality of PS-poll transmission STAs, respectively, through a DL MU PPDU. A channel through the DL data frame 1630 is transmitted may be determined by taking into consideration the AID of each of the plurality of PS-poll transmission STAs or may be indicated by the AP based on the PPDU header of the DL MU PPDU. For example, an STA that belongs to four STAs corresponding to a specific PS-poll frame transmission sequence number and that corresponds to the smallest AID may receive the DL data frame 1630 through a channel 1. Channels may be sequentially allocated to the STAs. An STA that belongs to the four STAs corresponding to a specific PS-poll frame transmission sequence number and that corresponds to the greatest AID may receive the DL data frame 1630 through a channel 4. Alternatively, the PPDU header of the DL MU PPDU through which the plurality of downlink frames 1630 is carried may include information about the reception frequency resources (or channel) of the downlink frame 1630 of each of the plurality of PS-poll transmission STAs.

Each of the plurality of PS-poll transmission STAs may transmit an ACK frame 1640 to the AP as a response to each of the plurality of DL data frames 1630.

Figure 17:
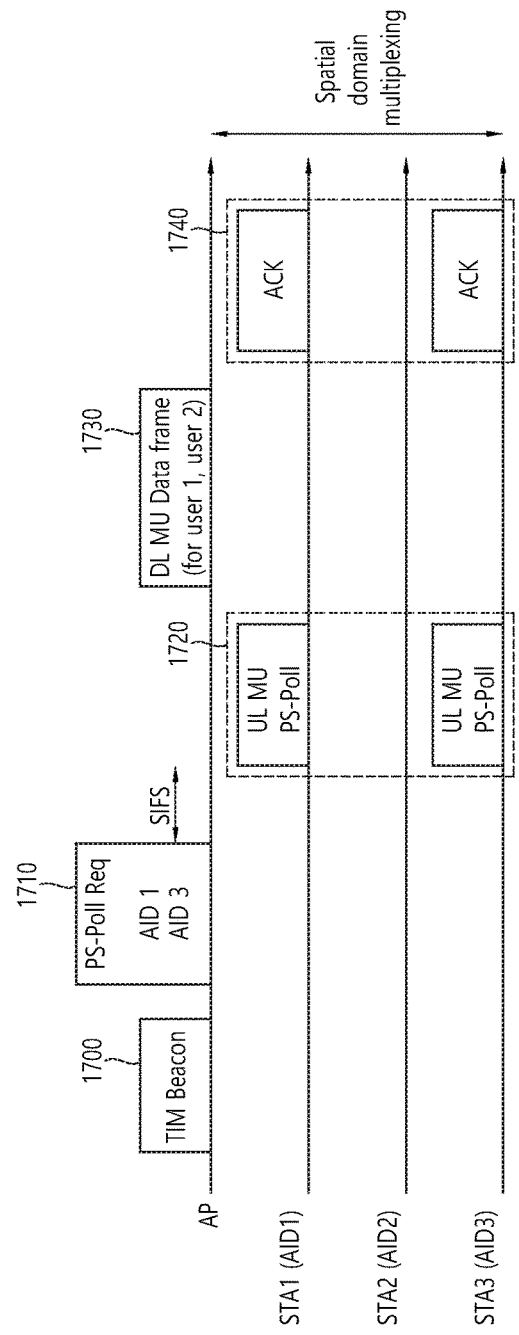
FIG. 17 is a conceptual diagram showing a method for transmitting a PS-poll frame based on UL MU OFDMA using an explicit grouping method according to an embodiment of the present invention.

FIG. 17 is a conceptual diagram showing a method for transmitting a PS-poll frame based on UL MU OFDMA using an explicit grouping method according to an embodiment of the present invention.

Referring to FIG. 17, in the method for transmitting a PS-poll frame based on UL MU OFDMA using an explicit grouping method, a PS-poll request frame may directly indicate a PS-poll transmission STA that will transmit a PS-poll frame. Furthermore, the PS-poll request frame may include information about space-time stream resources for the transmission of a PS-poll frame by a PS-poll transmission STA.

A plurality of STAs may receive a beacon frame 1700 and may determine whether pending downlink data is present based on a virtual bitmap included in the TIM element of the beacon frame 1700. An STA operating in a power saving mode based on a TIM may switch to a doze state if the presence of a pending downlink frame is not indicated based on the virtual bitmap included in the TIM element.

A target STA in which the presence of a pending downlink frame has been indicated based on the virtual bitmap included in the TIM element may monitor the transmission of the PS-poll request frame 1710 while maintaining an awake state.

The AP may transmit a PS-poll request frame 1710. The AP may transfer the PS-poll request frame 1710 to target STAs based on a DL MU PPDU format. The PS-poll request frame 1710 may include information about a plurality of PS-poll transmission STAs that belongs to the target STAs and that will transmit PS-poll frames 1720 and information about space-time stream resources for the transmission of the PS-poll frames 1720 of the plurality of PS-poll transmission STAs.

Each of the target STAs that have receive the PS-poll request frame 1710 may determine whether or not to transmit the PS-poll frame 1720 based on information about the plurality of PS-poll transmission STAs included in the PS-poll request frame 1710.

Each of the plurality of PS-poll transmission STAs that belongs to the target STAs and whose transmission of the PS-poll frames 1720 has been indicated based on the information about the plurality of PS-poll transmission STAs included in the PS-poll request frame 1710 may transmit the PS-poll frame 1720 on a space-time stream, allocated based on the information about the space-time stream resources for the transmission of the PS-poll frame 1720 of each of the plurality of PS-poll transmission STAs, based on UL MU MIMO.

For example, it may be assumed that information about the plurality of PS-poll transmission STAs included in the PS-poll request frame 1710 indicates the STA1, STA2, STA3, and STA4 of the target STAs and information about space-time stream resources for the transmission of the PS-poll frames 1720 of the plurality of PS-poll transmission STAs included in the PS-poll request frame 1710, respectively, indicates a space-time stream1, a space-time stream2, a space-time stream3, and a space-time stream4. In this case, the STA1 may transmit the PS-poll frame 1720 to the AP through the space-time stream1, the STA2 may transmit the PS-poll frame 1720 to the AP through the space-time stream2, and the STA3 may transmit the PS-poll frame 1720 to the AP through the space-time stream3, and the STA4 may transmit the PS-poll frame 1720 to the AP through the space-time stream4 on overlapped time resources based on UL MU MIMO.

Alternatively, information about space-time stream resources for the transmission of the PS-poll frame 1720 of each of the plurality of PS-poll transmission STAs may include information about the number of space-time streams for the transmission of the PS-poll frame 1720 of each of the plurality of PS-poll transmission STAs.

The PS-poll request frame 1710 may include information about a modulation and coding scheme (MCS) (MCS information) to be used when the PS-poll frame 1720 is transmitted by each of the plurality of PS-poll transmission STAs and information for the correction of time resources and frequency resources for the transmission of the PS-poll frame 1720 of each of the plurality of PS-poll transmission STAs.

The information for the correction of time resources for the transmission of the PS-poll frame 1720 of each of the plurality of PS-poll transmission STAs may be included in a time advance field and transmitted through the PS-poll request frame 1710. The information for the correction of frequency resources for the transmission of the PS-poll frame 1720 of each of the plurality of PS-poll transmission STAs may be included in a frequency offset field and transmitted through the PS-poll request frame 1710.

Each of the plurality of PS-poll transmission STAs may correct time resources and frequency resources through which the PS-poll frame 1720 is to be transmitted based on a time advance field and a frequency offset field.

The AP may receive the PS-poll frame 1720 from each of the plurality of PS-poll transmission STAs, and may transmit a plurality of DL data frames 1730 to the plurality of PS-poll transmission STAs, respectively.

The AP may transmit the DL data frames 1730 to the plurality of PS-poll transmission STAs, respectively, through a plurality of frequency resources (e.g., a channel 1 to a channel 4, respectively) or a plurality of space-time stream resources (e.g., a space-time stream1 to a space-time stream 4, respectively) based on a DL MU PPDU format.

Each of the plurality of PS-poll transmission STAs may transmit an ACK frame 1740 to the AP in response to each of the plurality of DL data frames 1730.

Figure 18:
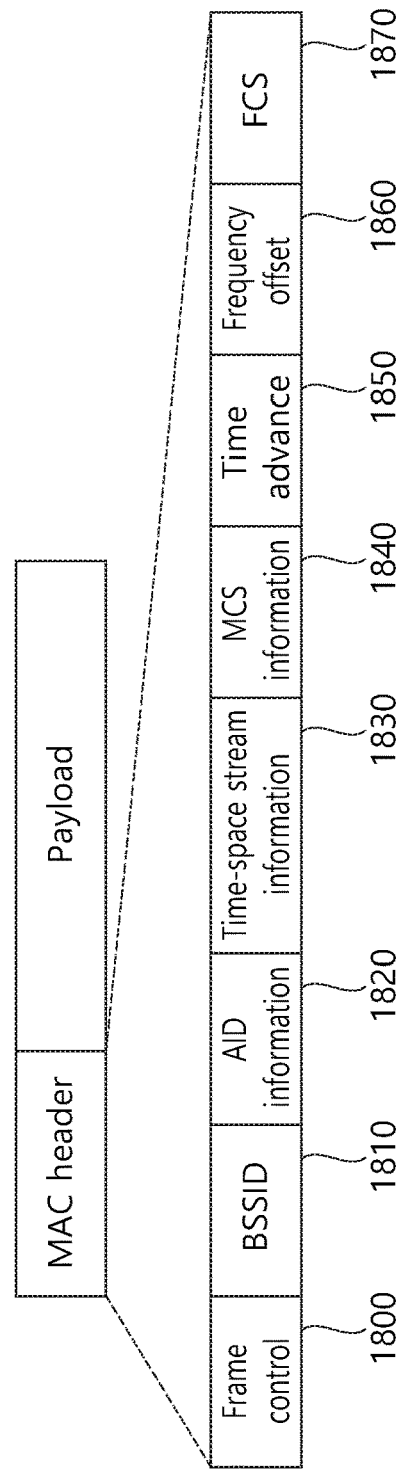
FIG. 18 is a conceptual diagram showing a PS-poll request frame according to an embodiment of the present invention.

FIG. 18 is a conceptual diagram showing a PS-poll request frame according to an embodiment of the present invention.

Referring to FIG. 18, the PS-poll request frame may include a frame control field 1800, a BSSID field 1810, an AID information field 1820, a space-time stream information field 1830, a MCS information field 1840, a time advance field 1850, a frequency offset field 1860, and an FCS 1870.

The frame control field 1800 may include information indicating that a transmitted frame is a PS-poll request frame.

The BSSID field 1810 may include source address information indicative of a source (e.g., an AP) that has transmitted a PS-poll request frame.

The AID information field 1820 may include AID information indicative of a PS-poll transmission STA that belongs to target STAs and that will transmit a PS-poll frame. In other words, the AID information field 1820 may include information about the AID of an STA (PS-poll transmission STA) that has to transmit a PS-poll frame using address information indicated based on a BSSID field as a receiving address (RA). The AID information field 1820 may include a maximum of four AIDs.

The space-time stream information field 1830 may include information about a space-time stream to be allocated for the transmission of a PS-poll frame by each of a plurality of PS-poll transmission STAs. For example, the space-time stream information field 1830 may include information about the space-time stream of each user that performs MU transmission according to the sequence of an AID indicated based on an AID information field.

The MCS information field 1840 may include information about an MSC for the transmission of a PS-poll frame of each of PS-poll transmission STAs.

The time advance field 1850 may include information for coordinating time resources for the transmission of a PS-poll frame of each of a plurality of PS-poll transmission STAs. For example, the time advance field 1850 may include time advance information measured through the transmission of a previous UL frame of each of a plurality of PS-poll transmission STAs. Each of the plurality of PS-poll transmission STAs may adjust the time based on the time advance field 1850 and transmit an UL frame.

The frequency offset field 1860 may include information for coordinating frequency resources for the transmission of a PS-poll frame of each of a plurality of PS-poll transmission STAs. For example, the frequency offset field 1860 may include frequency offset information for the correction of a frequency band determined based on the transmission of previous UL frames of a plurality of PS-poll transmission STAs. Each of the plurality of PS-poll transmission STAs may adjust a frequency band based on the frequency offset field 1860 and transmit an UL frame.

The FCS 1870 may include information for checking whether a frame includes an error.

In a method for transmitting a PS-poll frame based on UL MU MIMO according to an embodiment of the present invention, when a PS-Poll frame based on MU-MIMO of a plurality of PS-poll transmission STAs is transmitted, the transmission syncs of PS-poll frames need to be synchronized.

The following methods may be used for the transmission synchronization of a plurality of PS-poll frames.

An AP may transmit information for the transmission sync of PS-poll frames in time resources and frequency resources through a PS-poll request frame. As described above, the PS-poll request frame may include a time advance field and frequency offset field for the transmission sync of PS-poll frames in time resources and frequency resources. A PS-poll transmission STA may receive a PS-poll request frame, may be synchronized on frequency resources and the time resources based on a time advance field and a frequency offset field, and may transmit a PS-poll frame.

In another method, an UL MU PPDU format for carrying a PS-poll request frame may be transmitted on an OFDM symbol including an extended CP. If an extended CP is used, the range of time sync on time resources may be widened compared to a case where a normal CP is used. Some fields of an UL MU PPDU may be transmitted on an OFDM symbol including the extended CP. For example, MAC payload (or a data field) for carrying a high efficiency (HE)-short training field (STF), an HE-signal (SIG), and a PS-poll frame may be transmitted on an OFDM symbol including an extended CP. Alternatively, an UL MU PPDU format may not include legacy parts (an L-STF, an L-LTF, and an L-SIG field) including a normal CP. A normal CP may be 800 nano second (ns), and an extended CP has a structure extended from a normal CP twice or four times and may be 1600 ns or 3200 ns. An extended CP may be used to lower an error of a frame in an indoor environment.

Figure 19:
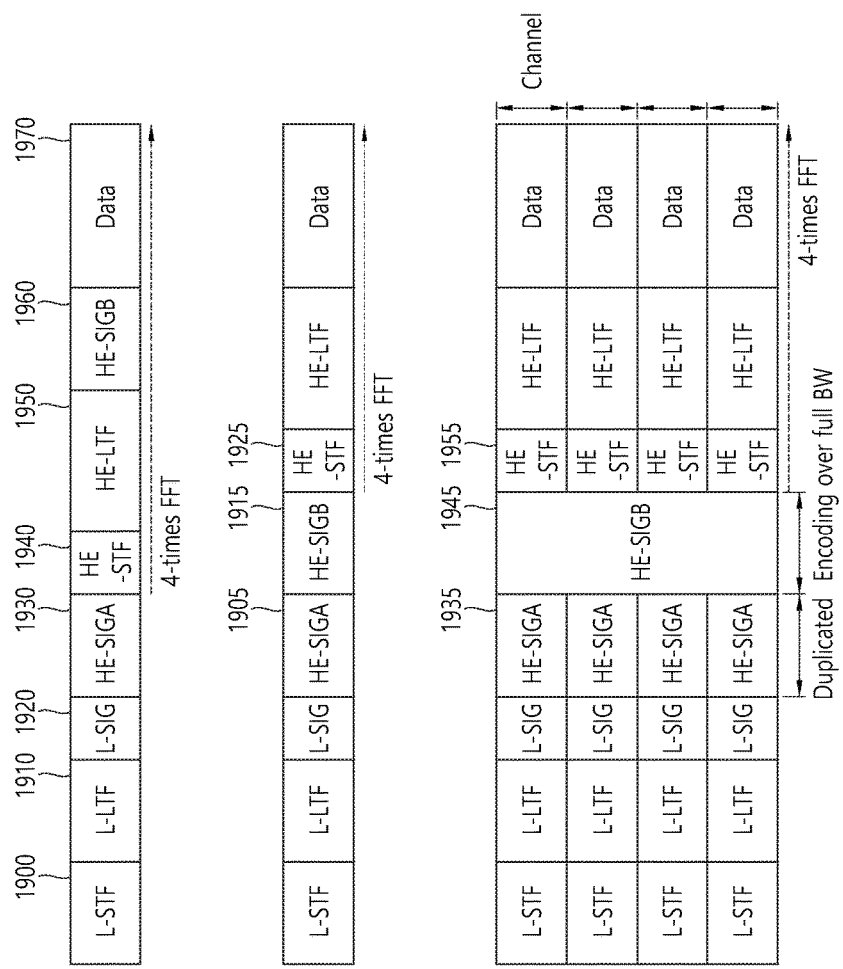
FIG. 19 is a conceptual diagram showing a PPDU format for delivering a frame according to an embodiment of the present invention.

FIG. 19 is a conceptual diagram showing a PPDU format for delivering a frame according to an embodiment of the present invention.

FIG. 19 discloses a PPDU format according to an embodiment of the present invention. A PPDU may include a PPDU header and a MAC protocol data unit (MPDU) (or a physical layer service data unit (PSDU)). A frame may correspond to an MPDU. The PPDU header of the PPDU format may be used as a meaning including the PHY header of a PPDU and a PHY preamble.

The PPDU format disclosed in FIG. 19 may be used to carry the aforementioned frames (e.g., the PS-poll request frame, the PS-poll frame, and the data frame).

Referring to the top of FIG. 19, the PPDU header of the PPDU may include a legacy-short training field (L-STF), a legacy-long training field (L-LTF), a legacy-signal (L-SIG), a high efficiency-signal (HE-SIG) A, a high efficiency-short training field (HE-STF), a high efficiency-long training field (HE-LTF), and a high efficiency-signal-B (HE-SIG B). A portion from the PHY header to the L-SIG may be divided into a legacy part and a high efficiency (HE) part after the L-SIG.

The L-STF 1900 may include a short training orthogonal frequency division multiplexing (OFDM) symbol. The L-STF 1900 may be used for frame detection, automatic gain control (AGC), diversity detection, and coarse frequency/time synchronization.

The L-LTF 1910 may include a long training orthogonal frequency division multiplexing (OFDM) symbol. The L-LTF 1910 may be used for fine frequency/time synchronization and channel estimation.

The L-SIG 1920 may be used to transmit control information. The L-SIG 1920 may include information about a data transfer rate and a data length.

The HE-SIG A 1930 may include the ID information of an STA for indicating a target STA that will receive a PPDU. An STA may determine whether or not to receive a PPDU based on the ID information of a target STA based on information included in the HE-SIG A 1930. If an STA is indicated based on the HE-SIG A 1930 of the PPDU, the STA may perform additional decoding on a downlink PPDU. Furthermore, the HE-SIG A 1930 may include information about resources (frequency resources (or subband) (upon transmission based on orthogonal frequency division multiplexing (OFDMA)) or space-time stream resources (upon transmission based on multiple input multiple output (MIMO)) through which downlink data is to be received. As described above, the HE-SIG A 1130 may include information about DL resources through which a DL data frame is to be received.

Furthermore, the HE-SIG A 1930 may include color bit information for identifying a BSS, bandwidth information, tail bits, CRC bits, modulation and coding scheme (MCS) information for the HE-SIG B 1960, symbol number information for the HE-SIG B 1960, and cyclic prefix (CP) (or guard interval (GI)) length information.

The HE-STF 1940 may be used to improve automatic gain control estimation in an MIMO environment or OFDMA environment.

The HE-LTF 1950 may be used to estimate a channel in an MIMO environment or OFDMA environment.

The HE-SIG B 1960 may include information about the length modulation and coding scheme (MCS) of a physical layer service data unit (PSDU) for each STA and tail bits.

The size of inverse fast Fourier transform (IFFT) applied to the HE-STF 1940 and a field after the HE-STF 1940 and the size of IFFT applied to a field prior to the HE-STF 1940 may be different. For example, the size of IFFT applied to the HE-STF 1940 and a field after the HE-STF 1940 may be a whole number times (e.g., four times) greater than the size of IFFT applied to a field prior to the HE-STF 1940. When an STA receives a PPDU, the STA may decode the HE-SIG A 1930 of the PPDU, and may determine whether or not to decode a field subsequent to the HE-SIG A 1930 based on the ID information of a target STA included in the HE-SIG A 1930. In this case, if the ID information of the target STA included in the HE-SIG A 1930 indicates the ID of the STA, the STA may perform decoding based on an FFT size changed from the HE-STF 1940 and a field after the HE-STF 1940. In contrast, if the ID information of the target STA included in the HE-SIG A 1930 does not indicate the ID of the STA, the STA may stop decoding and perform a network allocation vector (NAV) configuration. The cyclic prefix (CP) of the HE-STF 1940 may have a greater size than the CP of another field. During such a CP, the STA may perform decoding on the downlink PPDU by changing the FFT size.

Order of the fields forming the PPDU format disclosed at the top of FIG. 19 may be changed. For example, as disclosed in the middle of FIG. 19, the HE-SIG B 1915 of an HE part may be located right after an HE-SIG A 1905. An STA may decode the HE-SIG A 1905 and the HE-SIG B 1915, may receive required control information, and may perform NAV setting. Likewise, the size of IFFT applied to an HE-STF 1925 and a field after the HE-STF 1925 may be different from the size of IFFT applied to a field prior to the HE-STF 1925.

An STA may receive the HE-SIG A 1905 and the HE-SIG B 1915. If the reception of the PPDU of the STA is indicated based on the HE-SIG A 1905, the STA may change an FFT size from the HE-STF 1925 and perform decoding on the PPDU. In contrast, if the STA receives the HE-SIG A 1905 and the reception of the PPDU is not indicated based on the HE-SIG A 1905, the STA may perform a network allocation vector (NAV) configuration.

Referring to the bottom of FIG. 19, there is disclosed a DL MU PPDU format/UL MU PPDU format (hereinafter referred to as an "MU PPDU") for downlink (DL) multi-user (MU)/UL MU transmission. The UL MU PPDU format is a viewpoint of an AP that receives an UL MU PPDU transmitted by a plurality of STAs. The PS-poll request frame and the downlink frame described with reference to FIGS. 6 to 18 may be transmitted through the DL MU PPDU, and the PS-poll frame may be transmitted through the data field (or MAC payload) of the UL MU PPDU.

The MU PPDU may be transmitted to an STA or AP through different DL transmission resource (frequency resources or a space-time stream or different UL transmission resources (frequency resources or a space-time stream). For example, an AP may transmit downlink data to a plurality of STAs through a plurality of channels (or subbands) based on a DL MU PPDU. The plurality of STAs may transmit UL data to the AP through a plurality of channels (or subbands) based on the UL MU PPDU.

HE-SIG As 1935 may be transmitted in a duplicated form in different transmission resources. An HE-SIG B 1945 may be transmitted in a form encoded on the entire transmission resources. A field after the HE-SIG B 1945 may include individual downlink data for a plurality of STAs, respectively/individual UL data transmitted by a plurality of STAs, respectively.

If fields included in the MU PPDU are transmitted through transmission resources, respectively, CRC for each of the fields may be included in the MU PPDU. In contrast, if a specific field included in the MU PPDU is encoded on the entire transmission resources and transmitted, CRC for each of the fields may not be included in the MU PPDU. Accordingly, overhead for CRC can be reduced. That is, the MU PPDU format according to an embodiment of the present invention can reduce CRC overhead using the HE-SIG B 1945 of a form encoded on the entire transmission resources.

Likewise, in the MU PPDU format, an HE-STF 1955 and a field subsequent to the HE-STF 1955 may be encoded based on an IFFT size different from that of a field prior to the HE-STF 1955. Accordingly, an STA or AP receives the HE-SIG A 1935 and the HE-SIG B 1945. If the reception of the MU PPDU is indicated based on the HE-SIG A 1935, the STA or AP may change an FFT size from the HE-STF 1955 and perform decoding on an MU PPDU.

Figure 20:
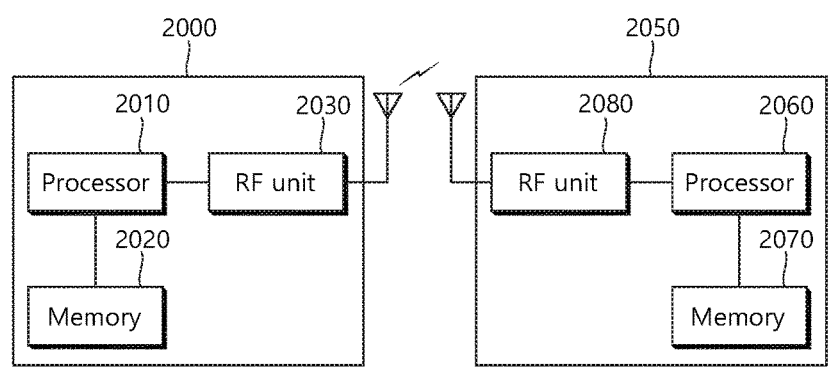
FIG. 20 is a block diagram showing a wireless apparatus to which an embodiment of the present invention may be applied.

FIG. 20 is a block diagram showing a wireless apparatus to which an embodiment of the present invention may be applied.

Referring to FIG. 20, the wireless apparatus 2000 is an STA capable of implementing the aforementioned embodiments, and may be an AP 2000 or a non-AP STA (or STA) 2050.

The AP 2000 includes a processor 2010, memory 2020, and a radio frequency (RF) unit 2030.

The RF unit 2030 is connected to the processor 2020 and may transmit/receive a radio signal.

The processor 2020 may implement the functions, processes and/or methods proposed in the present invention. For example, the processor 2020 may be implemented to perform the aforementioned operations of the wireless apparatus according to an embodiment of the present invention. The processor may perform the operations of the AP disclosed in the embodiments of FIGS. 6 to 18.

For example, the processor 2020 may be implemented to transmit a beacon frame and to transmit a power saving (PS)-poll request frame to a plurality of target stations (STA) notified of the presence of pending downlink data based on the virtual bitmap of a traffic indication map (TIM) element included in the beacon frame. Furthermore, the processor 2020 may be implemented to receive a plurality of PS-poll frames on overlapped time resources from a plurality of PS-poll transmission STAs that belongs to the plurality of target STAs and that indicated based on PS-poll request frames, respectively, and to transmit a plurality of downlink frames to the plurality of PS-poll transmission STAs, respectively, in response to the plurality of PS-poll frames on overlapped time resources.

The STA 2050 includes a processor 2060, memory 2070, and a radio frequency (RF) unit 2080.

The RF unit 2080 is connected to the processor 2060 and may transmit/receive a radio signal.

The processor 2060 may implement the functions, processes and/or methods proposed in the present invention. For example, the processor 2060 may be implemented to perform the aforementioned operations of the wireless apparatus according to an embodiment of the present invention. The processor may perform the operations of the wireless apparatus in the embodiments of FIGS. 6 to 18.

For example, the processor 2060 may be implemented to receive a beacon frame from an access point (AP), to receive a power saving (PS)-poll request frame from the AP, to transmit a PS-poll frame to the AP in response to the PS-poll request frame, and to receive downlink frame from the AP in response to the PS-poll frame.

Furthermore, the processor 2060 may be implemented to determine whether the first PS-poll frame transmission sequence of an STA determined based on a virtual bitmap is identical with a second PS-poll frame transmission sequence included in a PS-poll request frame and to transmit a PS-poll frame to an AP if the first PS-poll frame transmission sequence and the second PS-poll frame transmission sequence are the same. The first PS-poll frame sequence is determined based on the grouping of a plurality of positive traffic indication bits included in a virtual bitmap. Information indicating the transmission of a PS-poll frame may include information about the second PS-poll frame transmission sequence.

Furthermore, the processor 2060 may be implemented to determine whether the AID of the STA is indicated based on an AID information field included in a PS-poll request frame and to transmit a PS-poll frame to an AP if the AID is indicated based on the AID information field.

The processor 2010, 2060 may include Application-Specific Integrated Circuits (ASICs), other chipsets, logic circuits, and/or data processors. The memory 2020, 2070 may include read-only memory (ROM), random access memory (RAM), flash memory, memory cards, storage media and/or other storage devices. The RF unit 2030, 2080 may include one or more antennas for transmitting and/or receiving a radio signal.

When an embodiment is implemented in software, the aforementioned scheme may be implemented using a module (process or function) which performs the aforementioned function. The module may be stored in the memory 2020, 2070 and executed by the processor 2010, 2060. The memory 2020, 2070 may be disposed to the processor 2010, 2060 internally or externally and connected to the processor 2010, 2060 using a variety of well-known means.

What is claimed is:

1. An operation method in a power saving mode in a wireless local area network (WLAN), the operation method comprising:
    transmitting, by an access point (AP), a beacon frame to a plurality of stations (STAs),
    wherein the beacon frame includes:
        a traffic indication map (TIM) information on whether a pending downlink data frame is present or not with respect to each of the plurality of STAs, and
        control information on whether the AP transmits a PS-poll request frame;
    transmitting, by the AP, the power saving (PS)-poll request frame according to the control information to a plurality of PS-poll transmission STAs belonging to one bit group among a plurality of bit groups,
    wherein the PS-poll request frame includes a transmission sequence number,
    wherein the PS-poll request frame triggers a plurality of PS-poll frames from the plurality of PS-poll transmission STAs, and
    wherein the transmission sequence number corresponds to the one bit group;
    receiving, by the AP in response to the PS-poll request frame, the plurality of PS-poll frames on overlapped time resources from the plurality of PS-poll transmission STAs; and
    transmitting, by the AP, a plurality of downlink frames to the plurality of PS-poll transmission STAs in response to the plurality of PS-poll frames.

2. The operation method of claim 1, wherein:
    the plurality of bit groups correspond to a plurality of target STAs indicated by positive indices in the TIM information, and
    the transmission sequence number is determined by the AP.

3. The operation method of claim 1, wherein:
    each of the plurality of PS-poll frames is received based on orthogonal frequency division multiple access (OFDMA) through each of a plurality of frequency resources, and
    the plurality of frequency resources is sequentially allocated to the plurality of PS-poll transmission STAs, respectively, based on association identifiers (AID) of the plurality of respective PS-poll transmission STAs.

4. The operation method of claim 1, wherein:
    the PS-poll request frame comprises an association identifier (AID) field and a channel information field,
    the AID field comprises information indicating each of the plurality of PS-poll transmission STAs, and
    the channel information field comprises information about each of a plurality of frequency resources allocated to the plurality of PS-poll transmission STAs, respectively, for transmission based on orthogonal frequency division multiple access (OFDMA) for the plurality of PS-poll frames.

5. The operation method of claim 1, wherein each the plurality of PS-poll frames is received based on contention-based channel access when the PS-poll request frame is not transmitted according to the control information.

6. An access point (AP) for a power saving mode operation in a wireless local area network (WLAN), the AP comprising:
    a radio frequency (RF) unit including a transceiver implemented to transmit or receive a radio signal; and
    a processor operatively connected to the RF unit,
    wherein the processor is implemented to:
        transmit a beacon frame to a plurality of stations (STAs),
        wherein the beacon frame includes:
            a traffic indication map (TIM) information on whether a pending downlink data frame is present or not with respect to each of the plurality of STAs, and
            control information on whether the AP transmits a PS-poll request frame;
        transmit a power saving (PS)-poll request frame according to the control information to a plurality of PS-poll transmission STAs belonging to one bit group among a plurality of bit groups,
        wherein the PS-poll request frame includes a transmission sequence number,
        wherein the PS-poll request frame triggers a plurality of PS-poll frames from the plurality of PS-poll transmission STAs, and
        wherein the transmission sequence number corresponds to the one bit group;
        receive the plurality of PS-poll frames on overlapped time resources from the plurality of PS-poll transmission STAs in response to the PS-poll request frame; and
        transmit a plurality of downlink frames to the plurality of PS-poll transmission STAs in response to the plurality of PS-poll frames.

7. The AP of claim 6, wherein:
    each of the plurality of PS-poll frames is received based on orthogonal frequency division multiple access (OFDMA) through each of a plurality of frequency resources, and
    the plurality of frequency resources is sequentially allocated to the plurality of PS-poll transmission STAs, respectively, based on association identifiers (AID) of the plurality of respective PS-poll transmission STAs.

8. The AP of claim 6, wherein:
    the PS-poll request frame comprises an association identifier (AID) field and a channel information field,
    the AID field comprises information indicating each of the plurality of PS-poll transmission STAs, and
    the channel information field comprises information about each of a plurality of frequency resources allocated to the plurality of PS-poll transmission STAs, respectively, for transmission based on orthogonal frequency division multiple access (OFDMA) for the plurality of PS-poll frames.

9. The AP of claim 6, wherein:
    the plurality of bit groups correspond to a plurality of target STAs indicated by positive indices in the TIM information, and
    the transmission sequence number is determined by the AP.

10. The AP of claim 6, wherein each the plurality of PS-poll frames is received based on contention-based channel access when the PS-poll request frame is not transmitted according to the control information.

* * * * *